(12) United States Patent
Jin et al.

(10) Patent No.: US 12,348,457 B2
(45) Date of Patent: Jul. 1, 2025

(54) COMMUNICATION METHOD, APPARATUS, ELECTRONIC DEVICE, AND COMPUTER READABLE STORAGE MEDIUM

(71) Applicant: SAMSUNG ELECTRONICS CO., LTD., Suwon-si (KR)

(72) Inventors: Yiran Jin, Beijing (CN); Haijie Qiu, Beijing (CN); He Wang, Beijing (CN); Yue Wu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 17/657,091

(22) Filed: Mar. 29, 2022

(65) Prior Publication Data

US 2022/0321310 A1 Oct. 6, 2022

(30) Foreign Application Priority Data

Mar. 31, 2021 (CN) .......................... 202110349679.5

(51) Int. Cl.
*H04W 36/08* (2009.01)
*H04B 7/185* (2006.01)
(Continued)

(52) U.S. Cl.
CPC ............ *H04L 5/0073* (2013.01); *H04L 5/023* (2013.01); *H04W 72/046* (2013.01); *H04W 76/15* (2018.02)

(58) Field of Classification Search
CPC .... H04W 76/15; H04W 84/06; H04L 5/00073
See application file for complete search history.

(56) References Cited

U.S. PATENT DOCUMENTS

2019/0313272 A1* 10/2019 Zhou ..................... H04W 24/10
2020/0162939 A1   5/2020 Kim et al.
(Continued)

FOREIGN PATENT DOCUMENTS

WO        2020067973 A1    4/2020
WO    WO-2020167814 A1 *  8/2020  ............ H04W 24/08
WO    WO-2021195012 A1 *  9/2021

OTHER PUBLICATIONS

3GPP RAN WG4 Meeting#92bis, R4-1911505 Title: Fusther consideration on te huplink duty cycle enhancements fo rteh MPE scenario (Year: 2019).*

(Continued)

*Primary Examiner* — Faruk Hamza
*Assistant Examiner* — Abusayeed M Haque

(57) ABSTRACT

The present disclosure provides a communication method, apparatus, electronic device, and computer readable storage medium. The method improves the Measurement Timing Configuration SMTC of a cell synchronization signal, the improved SMTC including SSB information of a serving beam cell and a neighbour beam cell, the neighbour beam cell including other beam cells covered by other beams, other than the serving beam, of a first non-terrestrial node covering the serving beam cell and/or beam cells covered by beams of a second non-terrestrial node adjacent to the first non-terrestrial node. Enabling the UE to obtain, in a timely and reliable manner, the SSB signals of the beam cells covered by beams, other than the serving beam, of a first non-terrestrial node and/or the beam cells covered by beams of the second non-terrestrial node for cell measurement in the non-terrestrial communication network.

14 Claims, 15 Drawing Sheets

(51) Int. Cl.
*H04L 5/00* (2006.01)
*H04L 5/02* (2006.01)
*H04W 72/044* (2023.01)
*H04W 76/15* (2018.01)

(56) References Cited

U.S. PATENT DOCUMENTS

| | | | |
|---|---|---|---|
| 2020/0374735 A1 | 11/2020 | Wei et al. | |
| 2021/0051618 A1 | 2/2021 | Yang et al. | |
| 2022/0007286 A1* | 1/2022 | Ciftcioglu | H04W 76/16 |
| 2022/0141904 A1* | 5/2022 | Yilmaz | H04L 5/0035 |
| | | | 370/329 |
| 2022/0183094 A1* | 6/2022 | Yilmaz | H04W 76/15 |
| 2022/0191779 A1* | 6/2022 | Bergqvist | H04W 24/10 |
| 2022/0286195 A1* | 9/2022 | Falkenstein, Jr. | H04W 88/08 |
| 2022/0394584 A1* | 12/2022 | Ishii | H04W 36/305 |
| 2023/0068134 A1* | 3/2023 | Teyeb | H04W 76/27 |

OTHER PUBLICATIONS

3GPP RAN WG4 Meeting#92bis, R4-1911505 Title:Further considerations on the uplink duty cycle enhancements for the MPE scenario (Year: 2019).*

3GPP TSG-RAN WG2 meetng#112e, R2-2009456 Title:SMTC and measurment gap configuration (Year: 2020).*

International Search Report and Written Opinion of the International Searching Authority dated Jul. 4, 2022, in connection with International Application No. PCT/KR2022/004485, 6 pages.

Mediatek Inc., "Efficient Configuration of SMTC and Measurement Gaps in NR-NTN", R2-2100258, 3GPP TSG-RAN WG2 Meeting #113-e, e-Meeting, Jan. 25-Feb. 5, 2021, 5 pages.

CATT, "Consideration on measurement for NTN system", R2-2100336, 3GPP TSG-RAN WG2 Meeting #113-e, e-Meeting, Jan. 25-Feb. 5, 2021, 3 pages.

Nokia et al., "On SMTC and measurements gaps for NTN", R2-2100530, 3GPP TSG-RAN WG2 Meeting #113 Electronic, Elbonia, Jan. 25-Feb. 5, 2021, 5 pages.

Supplementary European Search Report dated Jul. 30, 2024, in connection with European Patent Application No. 22781598.2, 11 pages.

Qualcomm Incorporated: "SMTC and measurement gap configuration", R2-2009456, 3GPP TSG-RAN WG2 Meeting #112e, E-Meeting: Nov. 2020, 3 pages.

Samsung: "[5020],[5021] SMTC occasion calculation for smtc3 for IAB-MT", R2-2003728, 3GPP TSG-RAN WG2 Meeting #109bis-e, Electronic, Apr. 2020, 12 pages.

ZTE Corporation et al: "Consideration on the measurement configuration and reporting in NTN", R2-2009804, 3GPP TSG-RAN WG2 Meeting #112e, E-Meeting: Nov. 2020, 10 pages.

* cited by examiner

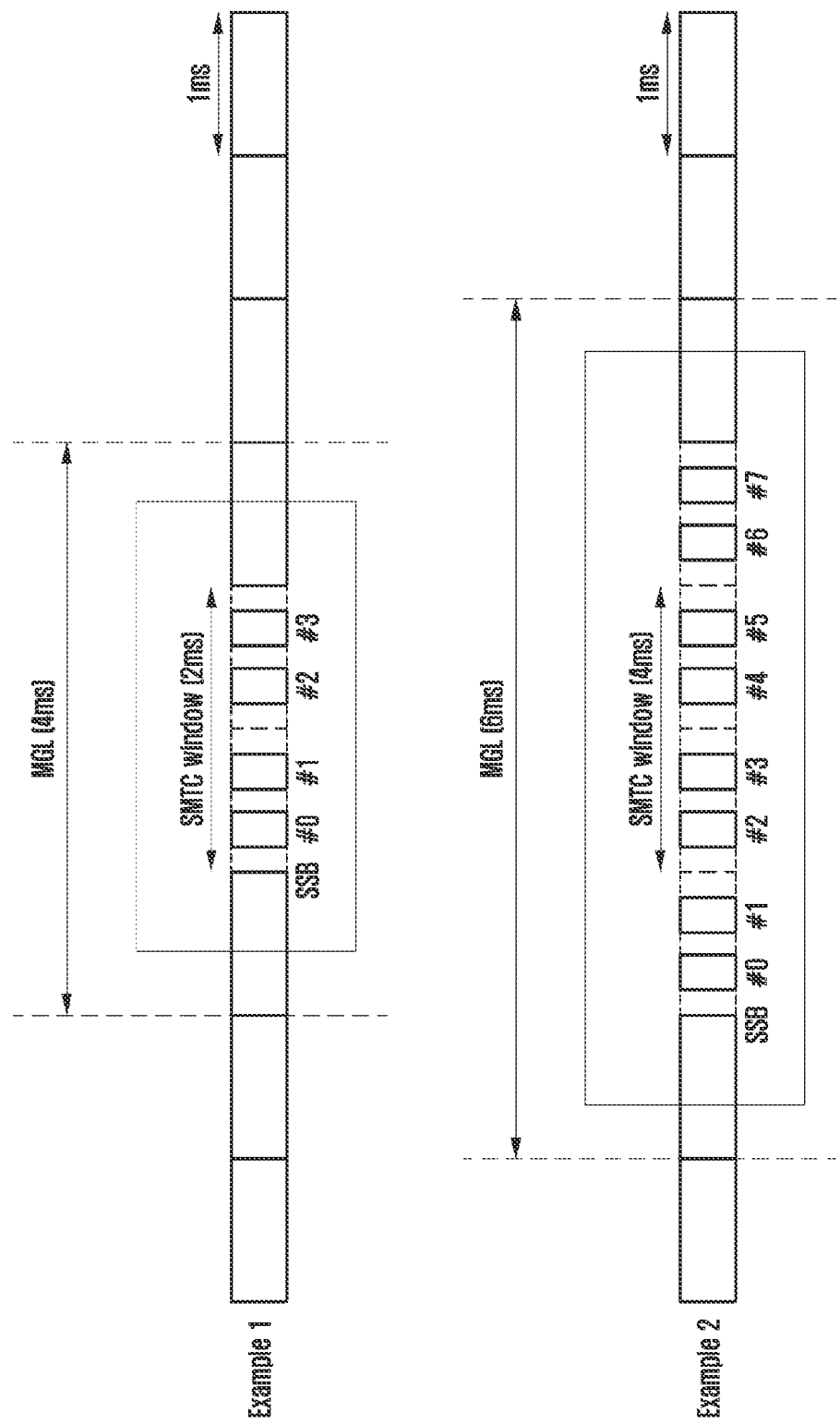

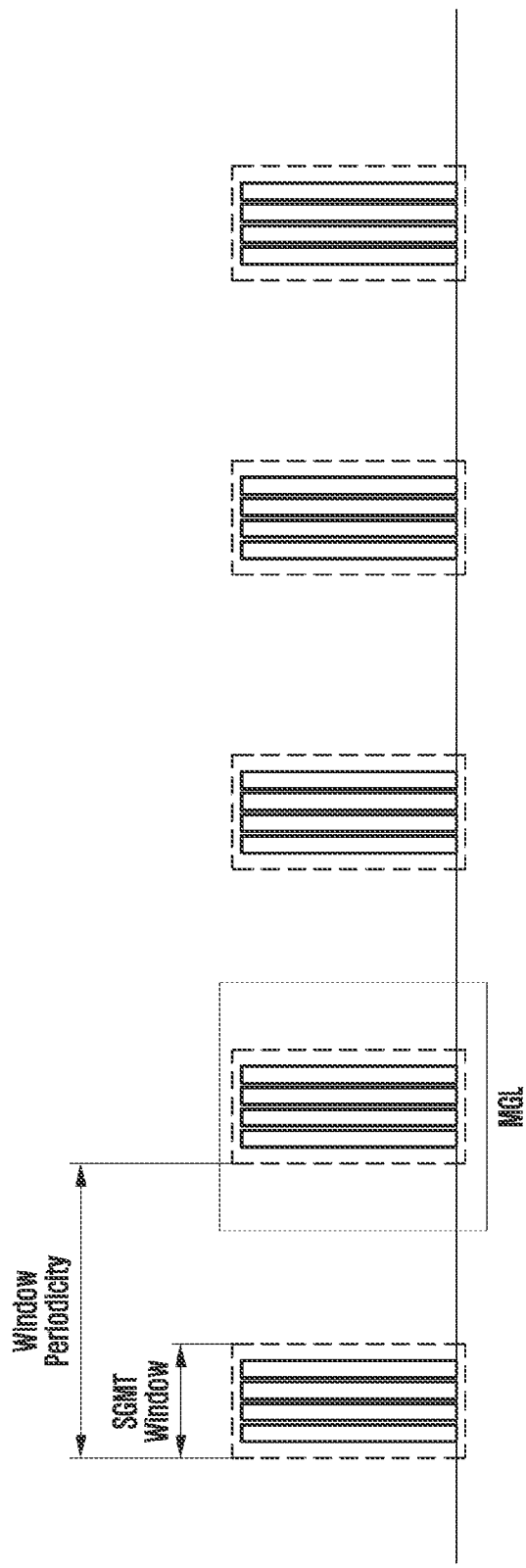

COMMUNICATION METHOD, APPARATUS, ELECTRONIC DEVICE, AND COMPUTER READABLE STORAGE MEDIUM

CROSS-REFERENCE TO RELATED APPLICATION

This application is based on and claims priority under 35 U.S.C. § 119(a) of a Chinese patent application number 202110349679.5, filed on Mar. 31, 2021, in the China National Intellectual Property Administration, the disclosure of which is incorporated by reference herein in its entirety.

BACKGROUND

1. Field

The present disclosure relates to the technical field of wireless communication, and in particular, the present disclosure relates to a communication method, a communication apparatus, an electronic device, and a computer readable storage medium.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the ¹⁄₁₀ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In a non-terrestrial communication system, a single cell beam of a non-terrestrial node can cover a larger area than that of a conventional 5G NR (New Radio, New Air interface) terrestrial mobile communication system. A signal transmission distance of the non-terrestrial communication system is much greater than that of a conventional 5G NR terrestrial mobile communication system. Signal transmission delays of the non-terrestrial communication system vary from tens of milliseconds to hundreds of milliseconds.

Therefore, when applying the existing 5G NR interface technology to a non-terrestrial communication system, the signal time delay can exceed the existing NR cell signal synchronization processing capability, and thus it is impossible to implement the measurement of cell signal of the non-terrestrial communication system.

SUMMARY

In order to overcome the above technical problems or at least partially solve them, the technical solutions will be described below.

In a first aspect, the present disclosure provides a method executed by a UE (User Equipment) in a communication system, the method comprising:

determining an SMTC (SSB (Synchronization Signal Block)-based RRM Measurement Timing Configuration, SSB-based RRM (Radio Resource Management) Measurement Timing Configuration); wherein the SMTC comprises SSB information of a serving beam cell and a neighbour beam cell; and the neighbour beam cell comprises other beam cell(s) covered by other beam(s), other than the serving beam, of a first non-terrestrial node covering the serving beam cell, and/or the neighbour beam cell comprises beam cell(s) covered by beam(s) of a second non-terrestrial node adjacent to the first non-terrestrial node; and performing a cell measurement based on the SMTC.

In a second aspect, the present disclosure provides a method executed by a non-terrestrial node in a communication system, the method comprising:

configuring an SMTC; wherein the SMTC comprises SSB information of a serving beam cell and a neighbour beam cell; the neighbour beam cell comprises other beam cell(s) covered by other beam(s), other than the serving beam, of a first non-terrestrial node covering the serving beam cell, and/or the neighbour beam cell comprises beam cell(s) covered by beam(s) of a second non-terrestrial node adjacent to the first non-terrestrial node; and transmitting the SMTC to a UE.

In a third aspect, the present disclosure provides a communication apparatus, communication apparatus, the apparatus comprising:

a determination module for determining an SMTC; wherein the SMTC comprises SSB information of a serving beam cell and a neighbour beam cell; the neighbour beam cell comprises other beam cell(s) covered by other beam(s), other than the serving beam, of a first non-terrestrial node covering the serving beam cell, and/or the neighbour beam cell comprises beam cell(s) covered by beam(s) of a second non-terrestrial node adjacent to the first non-terrestrial node; and a measurement module for performing a cell measurement based on the SMTC.

In a fourth aspect, the present disclosure provides a communication apparatus, the apparatus comprising:

a configuration module for configuring an SMTC; wherein the SMTC comprises SSB information of a serving beam cell and a neighbour beam cell, the neighbour beam cell comprises other beam cell(s) covered by other beam(s), other than the serving beam, of a first non-terrestrial node covering the serving beam cell, and/or the neighbour beam cell comprises beam cell(s) covered by beam(s) of a second non-terrestrial node adjacent to the first non-terrestrial node; and a transmitting module for transmitting the SMTC to a UE.

In a fifth aspect, the present disclosure provides an electronic device, the electronic device comprising:

a processor and a memory; wherein the memory comprises instructions that, when executed by the processor, cause the processor to: determine a Synchronization Signal Block (SSB) Measurement Timing Configuration (SMTC); wherein the SMTC comprises SSB information of a serving beam cell and a neighbour beam cell; the neighbour beam cell comprises other beam cells covered by other beams, other than a serving beam, of a first non-terrestrial node covering the serving beam cell, and/or the neighbour beam cell comprises beam cells covered by beams of a second non-terrestrial node adjacent to the first non-terrestrial node; and perform a cell measurement based on the SMTC.

In a sixth aspect, the present disclosure provides an electronic device, the electronic device comprising:

a processor and a memory; the memory comprising instructions that, when executed by the processor, cause the processor to: configure a Synchronization Signal Block (SSB) Measurement Timing Configuration (SMTC); wherein the SMTC comprises SSB information for a serving beam cell and a neighbour beam cell; the neighbour beam cell comprises other beam cells covered by other beams, other than a serving beam, of a first non-terrestrial node covering the serving beam cell, and/or the neighbour beam cell comprises beam cells covered by beams of a second non-terrestrial node adjacent to the first non-terrestrial node; and transmit the SMTC to a user equipment (UE).

In a seventh aspect, the present disclosure provides a computer readable storage medium comprising instructions that, when executed by a processor, cause the processor to: determine a Synchronization Signal Block (SSB) Measurement Timing Configuration (SMTC); wherein the SMTC comprises SSB information of a serving beam cell and a neighbour beam cell; the neighbour beam cell comprises other beam cells covered by other beams, other than a serving beam, of a first non-terrestrial node covering the serving beam cell, and/or the neighbour beam cell comprises beam cells covered by beams of a second non-terrestrial node adjacent to the first non-terrestrial node; and perform a cell measurement based on the SMTC.

In an eighth aspect, the present disclosure provides a computer readable storage medium comprising instructions that, when executed by a processor, cause the processor to: configure a Synchronization Signal Block (SSB) Measurement Timing Configuration (SMTC); wherein the SMTC comprises SSB information for a serving beam cell and a neighbour beam cell; the neighbour beam cell comprises other beam cells covered by other beams, other than a serving beam, of a first non-terrestrial node covering the serving beam cell, and/or the neighbour beam cell comprises beam cells covered by beams of a second non-terrestrial node adjacent to the first non-terrestrial node; and transmit the SMTC to a user equipment (UE).

The communication method, the apparatus, the electronic device, and the computer readable storage medium provided by the present disclosure improve the Measurement Timing Configuration SMTC for cell synchronization signals. The improved SMTC comprises SSB information of a serving beam cell and a neighbour beam cell; wherein the neighbour beam cell comprises other beam cell(s) covered by other beam(s), other than the serving beam, of a first non-terrestrial node covering the serving beam cell, and/or the neighbour beam cell comprises beam cell(s) covered by beam(s) of a second non-terrestrial node adjacent to the first non-terrestrial node, so that the UE could timely and reliably obtain SSB signals of the beam cell covered by the beam, other than the serving beam, of the first non-terrestrial node and/or SSB signals of the beam cell covered by the beam of the second non-terrestrial node so as to implement a cell measurement in a non-terrestrial communication network.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to explain the technical solutions in the embodiments of the present disclosure more clearly, the drawings used in the description of the embodiments of the present disclosure will be briefly illustrated below.

FIG. 6b illustrates a schematic diagram of a relationship between a SMTC window and an MGL provided in an embodiment of the present disclosure;

FIG. 7a illustrates a schematic diagram I of an extended MGL provided in an embodiment of the present disclosure;

DETAILED DESCRIPTION

Figure 1:
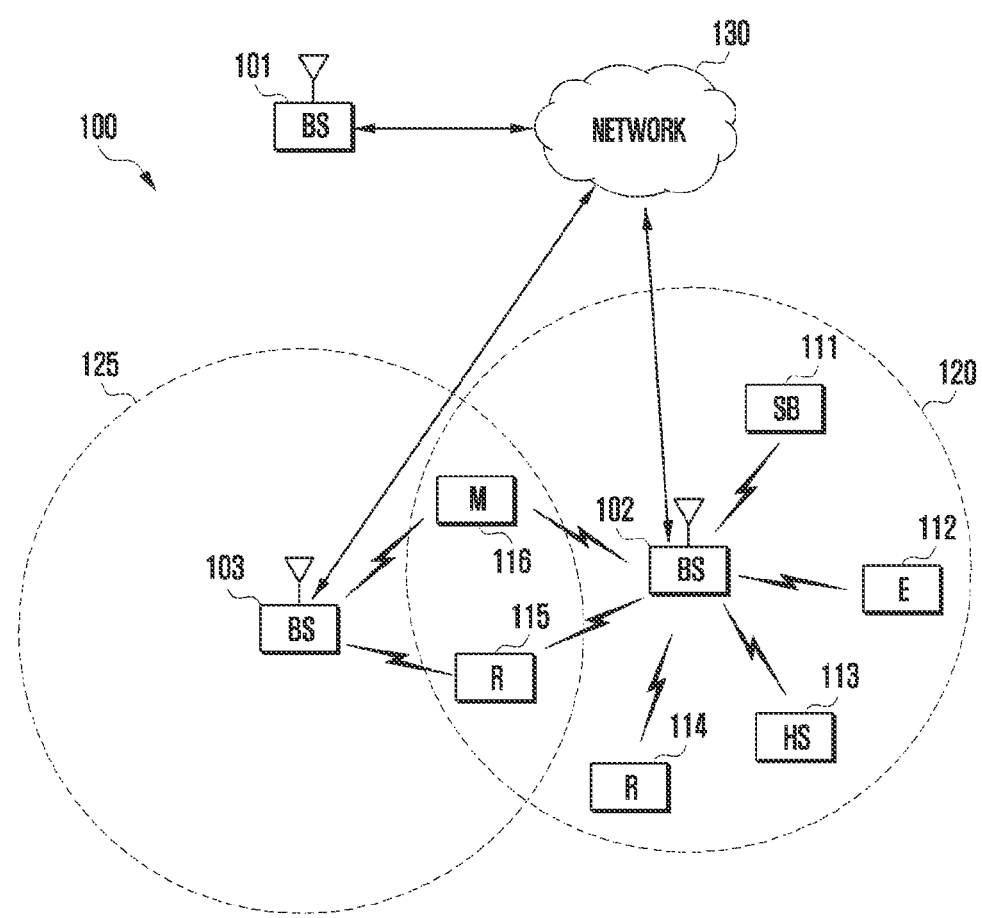
FIG. 1 illustrates a schematic diagram of a general structure of a wireless network provided in an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments of the present disclosure are described in detail below, and the examples of the embodiments are illustrated in the accompanying drawings, wherein the same or similar reference numerals are used to depict the same or similar elements or elements having the same or similar functions throughout. The embodiments described below with reference to the accompanying drawings are exemplary, and are only used to explain the present disclosure, and should not be interpreted as limiting the present disclosure.

It will be understood by those skilled in the art that the singular forms "a", "an" and "the" as used herein may include the plural forms as well, unless they are specifically stated otherwise in the context. As used herein, it is to be understood that the terms such as "including," "having," and "comprising" are intended to indicate a presence of stated features, integers, steps, operations, elements, and/or components disclosed in the specification, and are not intended to preclude a presence or an addition of one or more other features, integers, steps, operations, elements, components and/or groups thereof. It will be understood by those skilled in the art that when an element is referred to as being "connected to," or "coupled to" another element, the element may be directly connected to, or coupled to the other element, or intervening elements may exist between the element and the other element. Furthermore, "connected" or "coupled" as used herein may include wirelessly connected or wirelessly coupled. As used herein, the term "and/or" includes all or any of units and all combinations of one or more of the associated listed items.

In order to describe objects, technical solutions and advantages of the present disclosure clearer, the embodiments of the present disclosure will be further described in detail hereinafter with reference to the accompanying drawings.

FIG. 1 illustrates an exemplary wireless network 100 in accordance with various embodiments of the present disclosure. The embodiments of the wireless network 100 shown in FIG. 1 are for illustrative purposes only. Other embodiments of the wireless network 100 can be used without departing from the scope of the present disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, it is possible to replace "gNodeB" or "gNB" and use other well-known terms such as a "base station" or an "access point". For the sake of convenience, the terms "gNodeB" and "gNB" are used in this patent document to refer to network infrastructure components that provide radio access to remote terminals. Furthermore, depending on the network type, it is possible to replace the term "user equipment" or "UE" and use other well-known terms such as a "mobile station," a "subscriber station," a "remote terminal," a "wireless terminal," or a "user device." For the sake of convenience, the terms "user equipment" and "UE" are used in this patent document to refer to remote wireless equipment that wirelessly accesses the gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs include: a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, Long Term Evolution (LTE), LTE-A, WiMAX, or other advanced wireless communication technologies.

Dotted lines show the approximate extents of the coverage areas 120 and 125, which are shown as approximately circular for the purposes of illustration and explanation only. It should be clearly understood that the coverage areas associated with the gNBs, such as the coverage areas 120 and 125, may have other shapes, including irregular shapes, depending upon the configuration of the gNBs and variations in the radio environment associated with natural obstacles and man-made obstacles.

As will be described in more detail below, one or more of the gNB 101, the gNB 102, and the gNB 103 include a 2D antenna array as described in the embodiments of the present disclosure. In some embodiments, one or more of the gNB 101, the gNB 102, and the gNB 103 support codebook designs and structures for systems with 2D antenna arrays.

Although FIG. 1 illustrates an example of a wireless network 100, various changes can be made to FIG. 1. For example, the wireless network 100 can include any number of gNBs and any number of UEs in any suitable arrangement. Furthermore, the gNB 101 can communicate directly with any number of UEs and provide wireless broadband access to network 130 for those UEs. Similarly, each gNB 102-103 can directly communicate with the network 130 and providing direct wireless broadband access to the network 130 to the UEs. In addition, the gNBs 101, 102 and/or 103 could provide access to other or additional external networks, such as external telephone networks or other types of data networks.

Figure 2A:
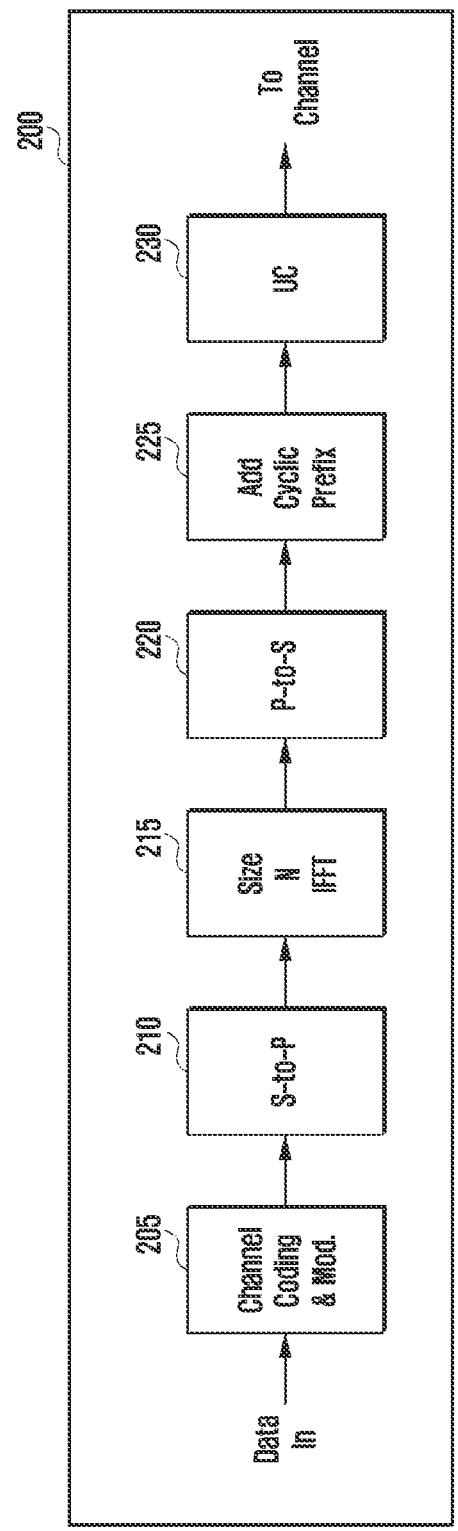
FIG. 2a illustrates a schematic diagram of a transmitting path provided in an embodiment of the present disclosure.
Figure 2B:
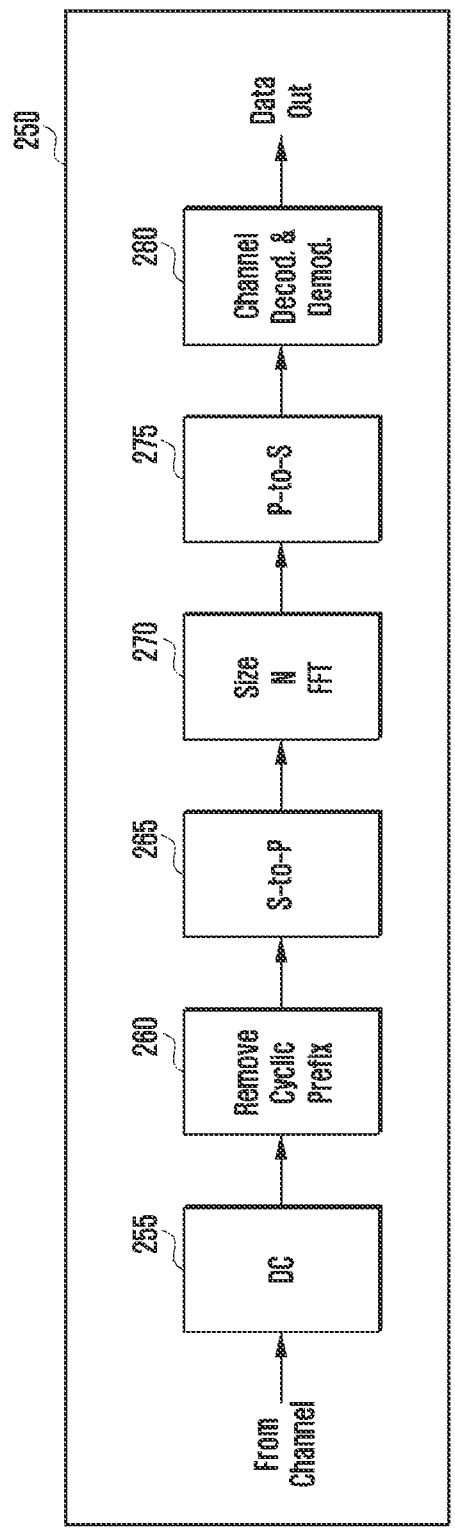
FIG. 2b illustrates a schematic diagram of a reception path provided in an embodiment of the present disclosure.

FIGS. 2a and 2b illustrate exemplary wireless transmission and reception paths according to the present disclosure. In the following description, the transmission path 200 can be described as being implemented in a gNB (such as the gNB 102), and the reception path 250 can be described as being implemented in a UE (such as the UE 116). However, it should be understood that the reception path 250 can be implemented in a gNB and the transmission path 200 can be implemented in a UE. In some embodiments, the reception path 250 is configured to support codebook designs and structures for systems 2D antenna arrays as described in the embodiments of the present disclosure.

The transmission path 200 includes a channel coding and modulation (Channel Coding & Mod.) block 205, a Serial-to-Parallel (S-to-P) block 210, N-point inverse fast Fourier transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a N-point fast Fourier transform (FFT) block 270, a Parallel-to-Serial (P-to-S) block 275, and a channel decoding and demodulation (Channel DeCod. & Demod.) block 280.

In the transmission path 200, the channel coding and the modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulation symbols. The Serial-to-Parallel (S-to-P) block 210 converts (such as demultiplexes) the serial modulation symbols into parallel data so as to generate N parallel symbol streams, wherein N is the number of data points of IFFT/FFT used in the gNB 102 and the UE 116. The N-point IFFT block 215 performs IFFT operations on the N parallel symbol streams so as to generate a time-domain output signal. The Parallel-to-Serial block 220 converts (such as multiplexes) the parallel time-domain output symbols from the N-point IFFT block 215 so as to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before up-converted to an RF frequency.

The RF signal transmitted from the gNB 102 arrives at UE 116 after passing through the wireless channel, and operations are performed at UE 116 in reverse to the operations at gNB 102. The down-converter 255 down-converts the received signal to a baseband frequency, and the cyclic prefix removal block 260 removes the cyclic prefix so as to generate a serial time-domain baseband signal. The Serial-to-Parallel block 265 converts the time-domain baseband signal to a parallel time-domain signal. The n-point FFT block 270 performs an FFT algorithm so as to generate N parallel frequency-domain signals. The Parallel-to-Serial block 275 converts the parallel frequency-domain signals into a sequence of modulated data symbols. The channel decoding and demodulation block 280 demodulates and decodes the modulation symbols to recover the original input data stream.

Each of gNBs 101-103 may implement a transmission path 200 similar to that for transmitting in the downlink to the UEs 111-116, and may implement a reception path 250 similar to that for receiving in the uplink from the UEs 111-116. Similarly, each of the UEs 111-116 may implement a transmission path 200 for transmitting in the uplink to the gNBs 101-103, and may implement a reception path 250 for receiving in the downlink from the gNBs 101-103. The transmission path 200 for transmitting and may implement a reception path 250 for receiving in the downlink from the gNBs 101-103.

Each of the components in FIG. 2a and FIG. 2b can be implemented using hardware only, or using a combination of hardware and software/firmware. As a particular example, at least some of the components in FIG. 2a and FIG. 2b can be implemented in software, while other components can be implemented in configurable hardware or a combination of software and configurable hardware. For example, The FFT block 270 and the IFFT block 215 may be implemented as configurable software algorithms, in which the value of the number N of data points may be modified according to the implementation.

Furthermore, although it is described as using FFT and IFFT, it is only illustrative and should not be interpreted as limiting the scope of the present disclosure. Other types of transforms such as the Discrete Fourier Transform (DFT) and the Discrete Fourier Inverse Transform (IDFT) functions are able to be used. It should be understood that for the DFT and IDFT functions, the value of the variable N may be any integer (such as 1, 2, 3, 4, etc.), while for the FFT and IFFT functions, the value of the variable N may be any integer as a power of 2 (such as 1, 2, 4, 8, 16, and the like).

Although FIGS. 2a and 2b illustrate exemplary wireless transmission and reception paths, various changes can be made to FIGS. 2a and 2b. For example, the various components of FIGS. 2a and 2b can be combined, further subdivided, or omitted, and additional components can be added according to a particular requirement. Furthermore, FIGS. 2a and 2b are intended to illustrate examples of types of the transmission and reception paths that can be used in a wireless network. Any other suitable architecture can be used to support wireless communications in a wireless network.

Figure 3A:
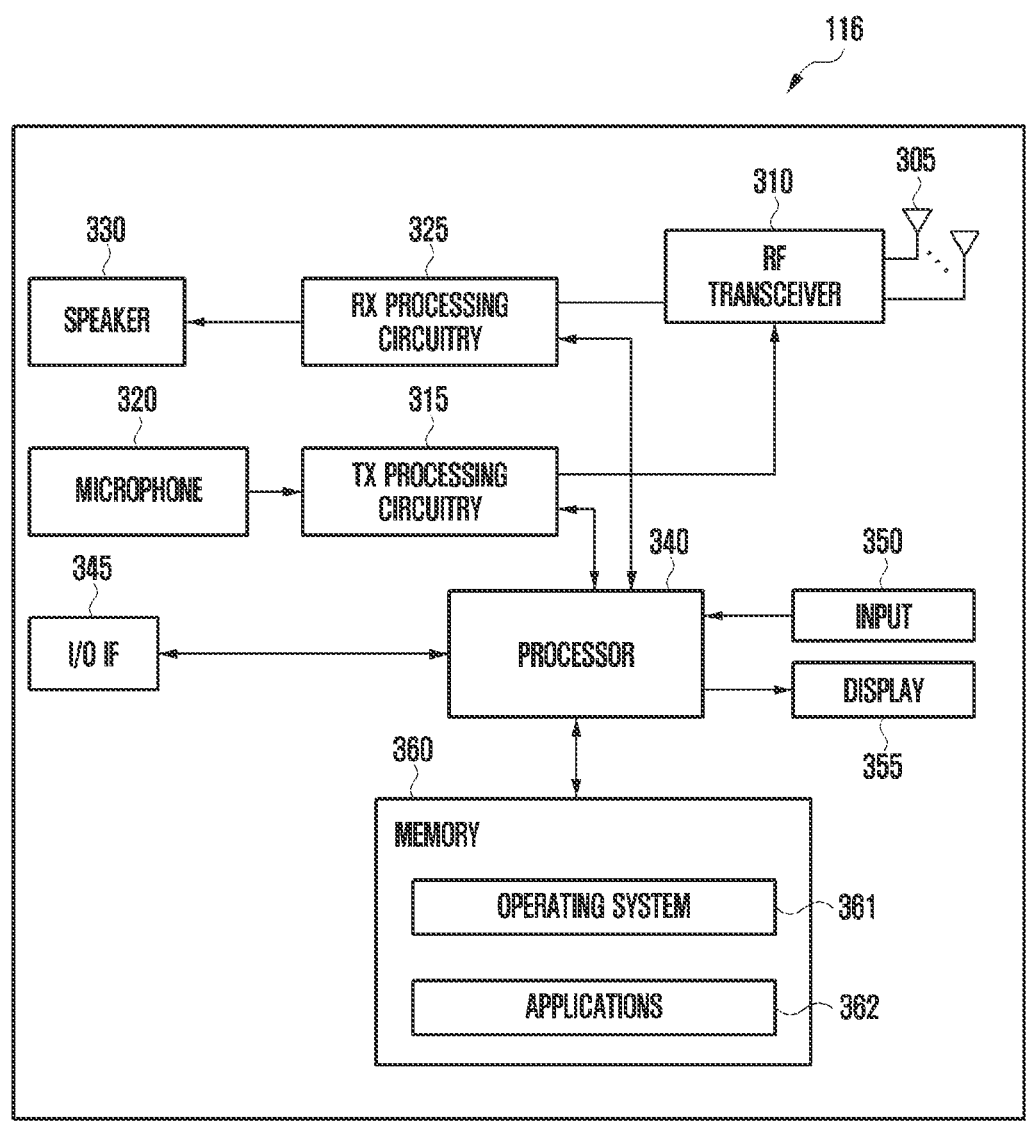
FIG. 3a illustrates a structural schematic diagram of a UE provided in an embodiment of the present disclosure.

FIG. 3a illustrates an exemplary UE 116 according to the present disclosure. The embodiment of the UE 116 illustrated in FIG. 3a is for an illustrative purpose only, and the UEs 111-115 of FIG. 1 could have the same or similar configuration. However, the UEs have a wide variety of configurations, and FIG. 3a does not limit the scope of the present disclosure to any particular embodiment of a UE.

The UE 116 includes an antenna 305, a Radio Frequency (RF) transceiver 310, a Transmission (TX) processing circuitry 315, a microphone 320, and a Reception (RX) processing circuitry 325. The UE 116 further comprises a speaker 330, a processor/controller 340, an input/output (I/O) interface 345, a (plurality of) input device(s) 350, a display 355, and a memory 360. The memory 360 includes an operating system (OS) 361 and one or more applications 362.

The RF transceiver 310 receives, from the antenna 305, an incoming RF signal transmitted by the gNB of the wireless network 100. The RF transceiver 310 down-converts the incoming RF signal so as to generate an intermediate frequency (IF) or baseband signal. The IF or baseband signal is transmitted to the RX processing circuitry 325, wherein the RX processing circuitry 325 generates a processed baseband signal by filtering, decoding, and/or digitizing the baseband or IF signal. The RX processing circuitry 325 transmits the processed baseband signal to the speaker 330 (such as for voice data) or to the processor/controller 340 for further processing (such as for web browsing data).

The TX processing circuitry 315 receives analog or digital voice data from the microphone 320, or other outgoing baseband data (such as web data, email, or interactive video game data) from the processor/controller 340. The TX processing circuitry 315 encodes, multiplexes, and/or digitizes the outgoing baseband data so as to generate a processed baseband or IF signal. The RF transceiver 310 receives the outgoing processed baseband or IF signal from TX processing circuitry 315, and up-converts the baseband or IF signal into an RF signal transmitted by the antenna 305.

The processor/controller 340 can include one or more processors or other processing devices and execute the OS 361 stored in the memory 360 in order to control the overall operation of the UE 116. For example, the processor/controller 340 could control the reception of forward channel signals and the transmission of reverse channel signals by the RF transceiver 310, the RX processing circuitry 325, and the TX processing circuitry 315 according to well-known principles. In some embodiments, the processor/controller 340 comprises at least one microprocessor or microcontroller.

The processor/controller 340 could further execute other processes and programs resident in the memory 360, such as operations for measuring and reporting channel quality for a system with a 2D antenna array as described in the embodiments of the present disclosure. The processor/controller 340 could move data into or out of the memory 360 according to requirements of the executed processes. In some embodiments, the processor/controller 340 is configured to execute the application(s) 362 based on the OS 361 or in response to signals received from the gNB or an operator. The processor/controller 340 is also coupled to the I/O interface (I/O IF) 345, wherein the I/O interface 345 provides the UE 116 with a capability to connect to other devices, such as laptops computers and handheld computers. The I/O interface 345 is a communication path between these accessories and the processor/controller 340.

The processor/controller 340 is also coupled to the (plurality of) input device(s) 350 and The display 355. The operator of the UE 116 could enter data into the UE 116 by using the (plurality of) input device(s) 350. The display 355 may be a liquid crystal display or other display capable of rendering text and/or at least limited graphics (such as from a website). The memory 360 is coupled to the processor/controller 340. A portion of the memory 360 could include a random access memory (RAM), while another portion of memory 360 could include a Flash memory or other read-only memory (ROM).

Although FIG. 3a illustrates an example of the UE 116, various changes can be made to FIG. 3a. For example, the various components of FIG. 3a can be combined, further subdivided, or omitted, and additional components can be added according to a particular requirement. As a particular example, the processor/controller 340 could be divided into multiple processors, such as one or more central processing units (CPUs) and one or more graphics processing units (GPUs). Furthermore, while FIG. 3a illustrates the UE 116 configured as a mobile telephone or a smartphone, the UE could be configured to operate as other types of mobile devices or stationary devices.

Figure 3B:
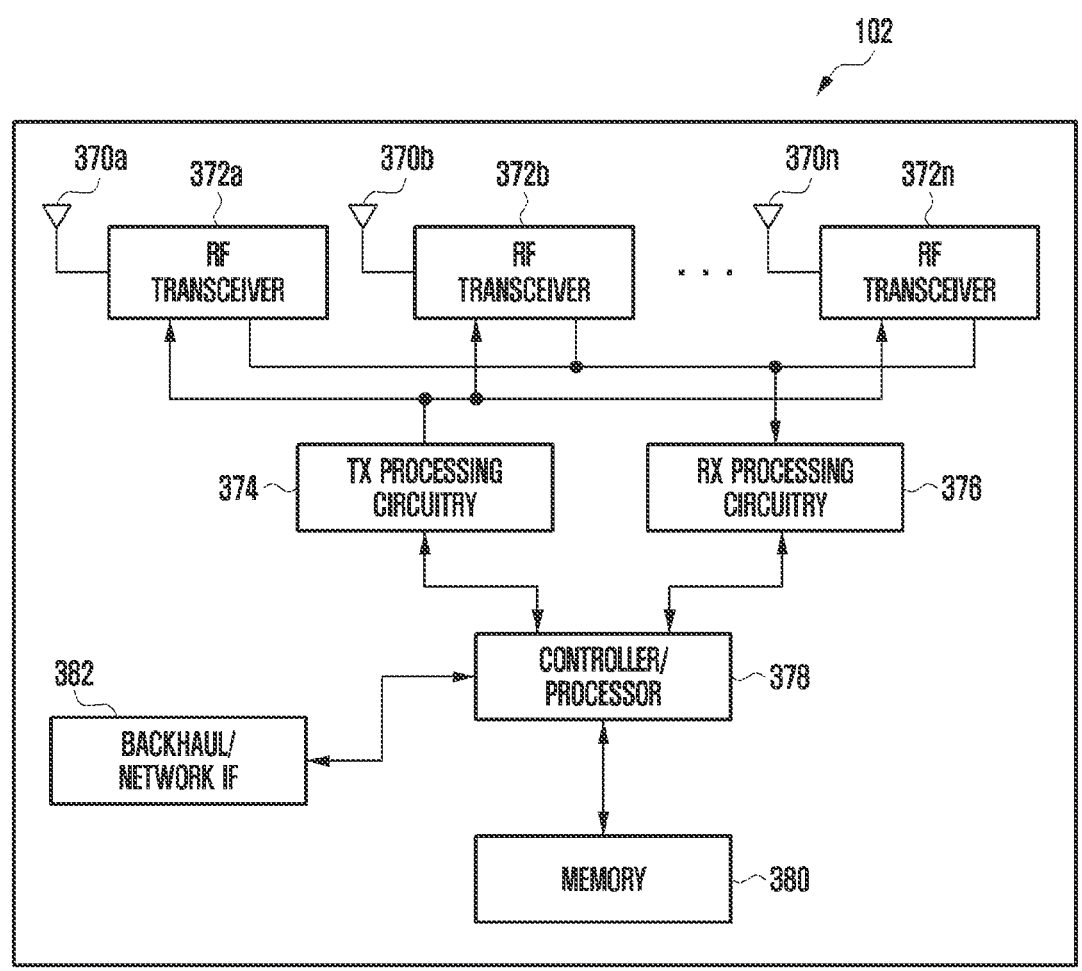
FIG. 3b illustrates a structural schematic diagram of a base station provided in an embodiment of the present disclosure.

FIG. 3b illustrates an exemplary gNB 102 according to the present disclosure. The embodiment of the gNB 102 shown in FIG. 3b is for illustrative purposes only, and other gNBs of FIG. 1 could have the same or similar configurations. However, the gNBs have a wide variety of configurations, and FIG. 3b does not limit the scope of the present disclosure to any particular embodiment of the gNBs. It should be noted that the gNB 101 and the gNB 103 could include the same or similar structures as the gNB 102.

As shown in FIG. 3b, the gNB 102 includes a plurality of antennas 370a-370n, a plurality of RF transceivers 372a-372n, a transmission (TX) processing circuitry 374, and a reception (RX) processing circuitry 376. In some embodiments, one or more of the plurality of antennas 370a-370n includes a 2D antenna array. The gNB 102 further comprises a controller/processor 378, a memory 380, and a backhaul or network interface (Backhaul/Network IF) 382.

The RF transceivers 372a-372n receive, from the antennas 370a-370n, incoming RF signals, such as those transmitted by the UEs or other gNBs. The RF transceivers 372a-372n down-convert the incoming RF signals so as to generate IF or baseband signals. The IF or baseband signals are transmitted to the RX processing circuitry 376, wherein the RX processing circuitry 376 generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, email, or interactive video game data) from the controller/processor 378. The TX processing circuitry 374 encodes, multiplexes, and/or digitizes the outgoing baseband data so as to generate processed baseband or IF signals. The RF transceivers 372a-372n receive the outgoing of the processed baseband or IF signals from TX processing circuitry 374, and up-convert the baseband or IF signals into RF signals transmitted by the antennas 370a-370n.

The controller/processor 378 could include one or more processors or other processing devices that control the overall operation of the gNB 102. For example, the controller/processor 378 could control the reception of forward channel signals and the transmission of backward channel signals by the RF transceivers 372a-372n, the RX processing circuitry 376, and the TX processing circuitry 374 according to well-known principles. The controller/processor 378 could support additional functions as well, such as more advanced wireless communication functions. For example, the controller/processor 378 could perform a BIS process such as those performed by a blind interference sensing (BIS) algorithm, and could decode the received signal that is subtracted by the interference signals. The controller/processor 378 can support any of a wide variety of other functions in the gNB 102. In some embodiments, the controller/processor 378 includes at least one microprocessor or microcontroller.

The controller/processor 378 could further execute programs and other processes resident in the memory 380, such as a basic OS. The controller/processor 378 could further support measuring and reporting channel quality for systems having a 2D antenna array as described in the embodiments of the present disclosure. In some embodiments, the controller/processor 378 supports communication between entities such as web RTCs. The controller/processor 378 could move data into or out of the memory 380 according to requirements of the executed processes.

The controller/processor 378 is also coupled to the backhaul or network interface 382. The backhaul or network interface 382 allows the gNB 102 to communicate with other devices or systems over a backhaul connection or over a network. The backhaul or network interface 382 could support communication over any suitable (plurality of) wired or wireless connection(s). For example, when the gNB 102 is implemented as part of a cellular communication system (such as a cellular communication system supporting 5G or a new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate with a larger network (such as the Internet) via a wired or wireless local area network or via a wired or wireless connection. The backhaul or network interface 382 includes any suitable structure that supports communication over a wired or wireless connection, such as an Ethernet or an RF transceiver.

The memory 380 is coupled to the controller/processor 378. A portion of the memory 380 can include a RAM, and another portion of the memory 380 can include a Flash memory or other ROM. In some embodiments, a plurality of instructions, such as the BIS algorithm, are stored in the memory. The plurality of instructions are configured to cause the controller/processor 378 to perform the BIS process and to decode a received signal after subtracting at least one interfering signal determined by the BIS algorithm.

As described in more detail below, the transmission and reception paths of the gNB 102 (implemented using the RF transceivers 372a-372n, the TX processing circuitry 374, and/or the RX processing circuitry 376) support communication with an aggregation of FDD cells and TDD cells.

Although FIG. 3b illustrates an example of the gNB 102, various changes can be made to FIG. 3b. For example, the gNB 102 could include any number of each component as shown in FIG. 3a. As a particular example, the access point could include a plurality of backhaul or network interfaces 382, and the controller/processor 378 could support routing functions to route data between different network addresses. As another particular example, while illustrated as including a single instance of the TX processing circuitry 374 and a single instance of the RX processing circuitry 376, the gNB 102 could include multiple instances of either of the TX processing circuitry 374 and the RX processing circuitry 376 (such as one corresponding to each RF transceiver).

In the terrestrial mobile communication system, base station signals in 5G NR neighbour cells are synchronized. Differences among transmission delays of the base station signals from different cells to the UE, are very small (such as about 5 μs). The difference of the transmission delays falls within the CP (Cyclic Prefix) processing capability of the UE. The cell measurement signal configured by the base station to the UE can be used to measure all neighbour cells of the base station.

Figure 4A:
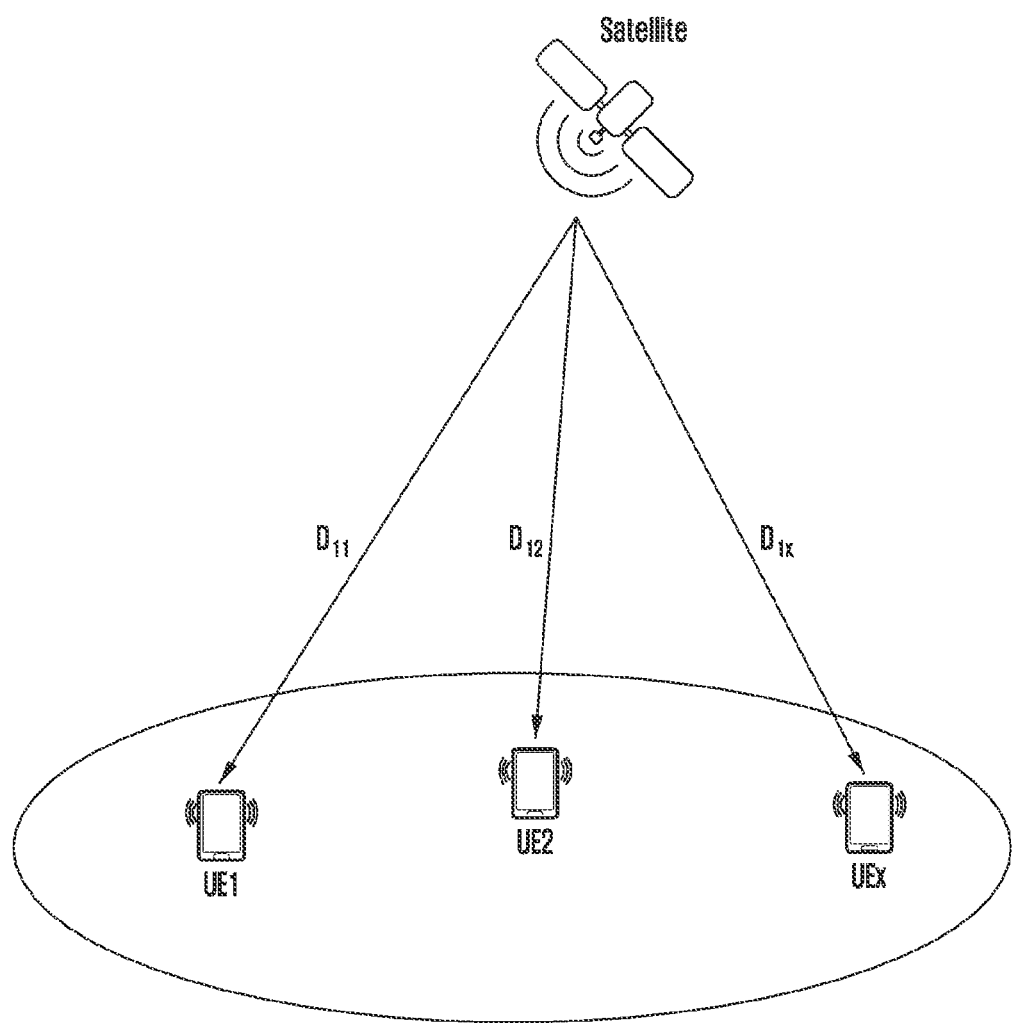
FIG. 4a illustrates a schematic diagram I of a satellite communication system provided in an embodiment of the present disclosure.

In contrast, for non-terrestrial communication systems, a single cell beam of a non-terrestrial node can cover a larger range. For example, taking the satellite communication system as an example, as shown in FIG. 4a, a single cell beam of a non-terrestrial node (satellite) can cover terminals such as UE1, UE2 . . . . UEx within hundreds of kilometers; D11, D12 . . . D1x are linear distances from the non-terrestrial node (satellite) to the terminals such as UE1, UE2 . . . UEx. Transmission distances of satellite signals are much longer than those in conventional 5G NR terrestrial mobile communication systems, and the difference of the transmission delays of satellite signals received by different receiving terminals in the same cell can reach about 10 ms, while the Doppler shift is also very large due to the high-speed mobility of the terminals (UEs) and the satellites.

Therefore, when the 5G NR interface technology is applied to a non-terrestrial communication system, the signal time delays will exceed the existing NR cell signal synchronization processing capability.

Figure 4B:
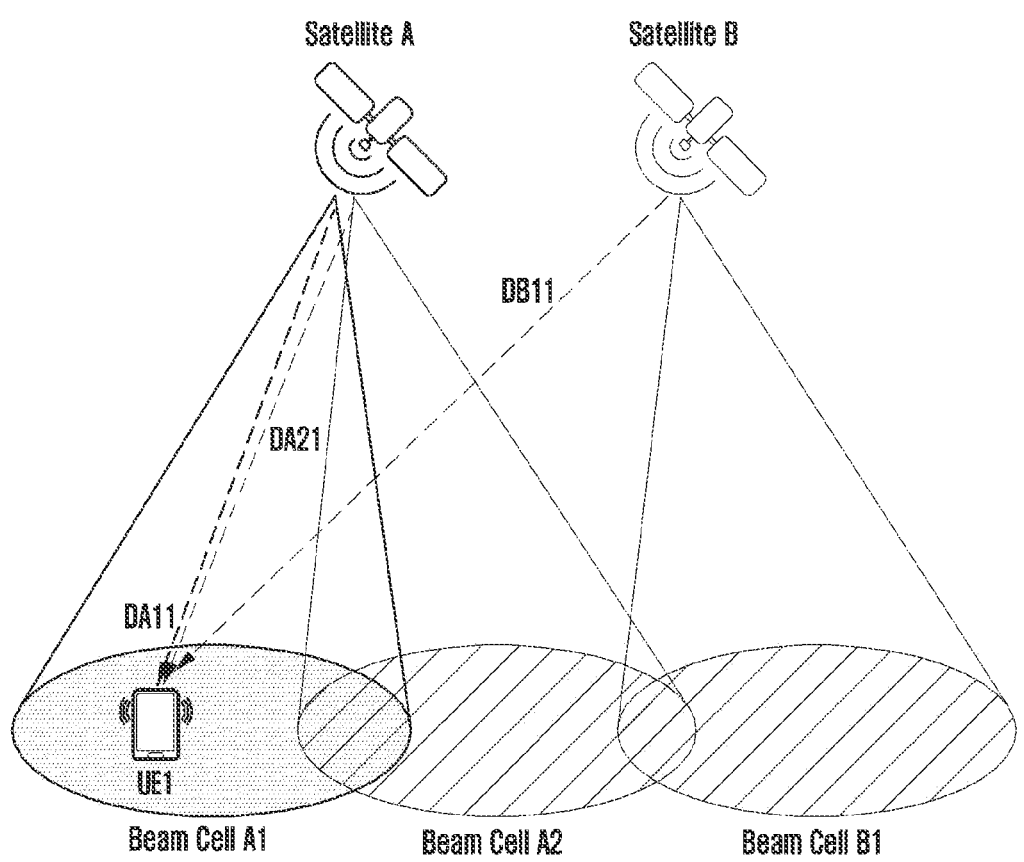
FIG. 4b illustrates a schematic diagram II of the satellite communication system provided in an embodiment of the present disclosure.

Continuing with the satellite communication system as an example, as shown in FIG. 4b, a beam 1 of a satellite (Sat) A forms a beam cell (Beam Cell) A1 on the ground, and a beam 2 forms a beam cell A2 on the ground; while a beam of the Sat B forms a beam cell B1 on the ground. The UE1 is located within the beam cell A1. If the 5G SSB-based measurement method is used in the related technologies, the following problems would be encountered.

1. For the SMTC in the technology related to 5G NR, the SSB signal broadcast by the satellite A does not include information of the beam cell A2, and the UE1 cannot implement the measurement of the beam cell A2.
2. The SSB signal broadcast by the satellite A includes information of beam cell B1. However, the difference between the transmission delays of the satellite A-UE1 and the satellite B-UE1 may reach about 10 ms, and the signals may fall outside the measurement gap window (Measurement Gap Window) of the UE1, going far beyond the CP processing capability of UE1, and thus the measurement can not be realized.

Therefore, the present disclosure hereby proposes a communication method that can effectively solve the above problem.

Exemplary embodiments of the present disclosure are further described below with reference to the accompanying drawings.

The text and accompanying drawings are provided as examples only, so as to assist the reader in understanding the present disclosure. They are not intended to be interpreted and should not be interpreted as limiting the scope of the present disclosure in any way. Although certain embodiments and examples have been provided, based on what is disclosed herein, it will be apparent to those skilled in the art that changes can be made to the embodiments and examples shown without departing from the scope of the present disclosure.

Figure 5:
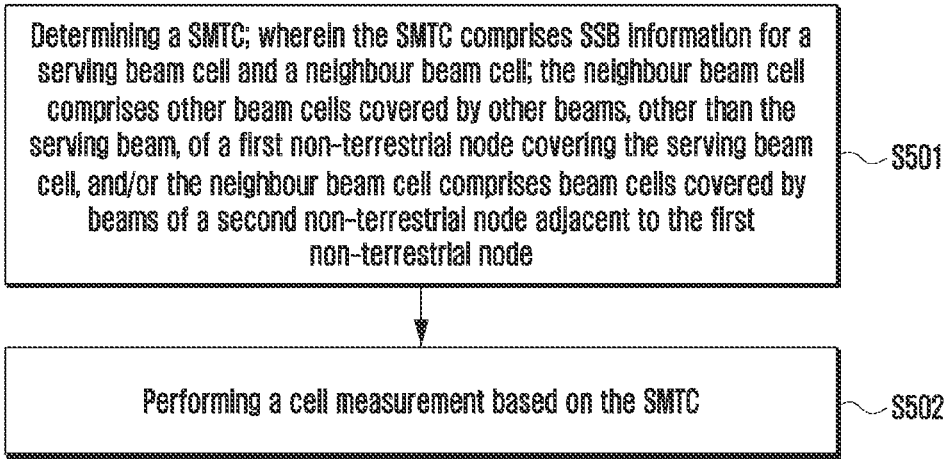
FIG. 5 illustrates a flow diagram of the method performed by the UE in the communication system provided in an embodiment of the present disclosure.

An embodiment of the present disclosure provides a communication method executed by a UE as an executing entity, as shown in FIG. 5, the method comprising:

Step S501: determining an SMTC; wherein the SMTC comprises SSB information of a serving beam cell and a neighbour beam cell; the neighbour beam cell comprises other beam cell(s) covered by other beam(s), other than the serving beam, of a first non-terrestrial node covering the serving beam cell, and/or the neighbour beam cell comprises beam cell(s) covered by beam(s) of a second non-terrestrial node adjacent to the first non-terrestrial node.

Step S502: performing a cell measurement based on the SMTC.

In the embodiment of the present disclosure, the non-terrestrial nodes include, but are not limited to, satellites, High Altitude Platform Stations (HAPS) such as airships, drones, hot air balloons, and the like. The non-terrestrial node may be a base station in the air/space or may be a node only used for transparent transmission in the air/space, i.e., receiving signals from a terrestrial base station and directly forwarding them to a terminal.

In an embodiment of the present disclosure, the base station may notify the UE of the relevant measurement configuration via an RRC (Radio Resource Control) message. In a feasible implementation, the SMTC may be indicated by a new air interface measurement object measObjectNR Information Element (IE) in the RRC message. That is, the new SMTC information is added to the MeasObjectNR IE in the 5G NR system of the related technology for defining the SSB information of the serving beam cell and the neighbour beam cell; wherein the neighbour beam cell comprises other beam cell(s) covered by other beam(s), other than the serving beam, of a first non-terrestrial node covering the serving beam cell, and/or the neighbour beam cell comprises the beam of the second non-terrestrial node adjacent to the first non-terrestrial node covered by the beam cell.

In another feasible implementation, the SMTC is indicated by a predefined Information Element in the RRC message. That is, a new IE (such as MeasObjectNR-NTN (Non-terrestrial Network) IE) is added, and new SMTC information is added in this new IE compared to the MeasObjectNR IE in the 5G NR system of the related technology for defining the SSB information of the serving beam cell and the neighbour beam cell; wherein the neighbour beam cell comprises other beam cell(s) covered by other beam(s), other than the serving beam, of a first non-terrestrial node covering the serving beam cell, and/or the neighbour beam cell comprises the beam of the second non-terrestrial node adjacent to the first non-terrestrial node covered by the beam cell.

The SMTC in the embodiment of the present disclosure may include at least one of the following scenarios.

(1) At least one SMTC comprising SSB information for each beam cell.

Optionally, one SMTC may comprise SSB information for each beam cell.

As an example, in the communication system of the 5G NR related technology, an SMTC1 and an SMTC2 are included in the MeasObjectNR IE. The SMTC1 is a primary Measurement Timing Configuration, and the SMTC2 is a secondary Measurement Timing Configuration, according to the introduction of the MeasObjectNR field description. When the signals are synchronized, the Periodicity is represented by a Periodicity in the SMTC2, and the time offset is equal to the offset indicated in the Periodicity with a periodicityAndOffset coefficient. The Periodicity in the SMTC2 can only be configured to a value strictly shorter than the Periodicity indicated by periodicityAndOffset in the SMTC1. For example, if periodicityAndOffset indicates sf10, then Periodicity can only be configured to sf5; and if periodicityAndOffset indicates sf5, the SMTC2 cannot be configured.

In the embodiment of the present disclosure, the added SMTC information may be a piece of SMTC information comprising SSB information of a plurality of beam cells. As an example of adding a new SMTC in the MeasObjectNR IE, a new SMTC3 may be added so as to comprise SSB information for each beam cell, then the corresponding MeasObjectNR field description may be the following:

smtc3
information for a beam cell 1.
information for a beam cell 2.
information for a beam cell 3.

Optionally, a plurality of SMTCs may comprise SSB information for each beam cell. Continuing with the example of adding a new SMTC to the MeasObjectNR IE, SMTC3 and SMTC4 may be added so as to comprise SSB information for a plurality of beam cells. SMTC3 and SMTC4 may correspond to SSB information for different numbers of beam cells. For example, SMTC3 comprises SSB information for one beam cell, while SMTC4 comprises SSB information for multiple beam cells, and the like.

(2) At least two SMTCs respectively corresponding to the SSB information for each beam cell.

That is, the new SMTC information can be added on a piece-by-piece basis corresponding to each beam cell respectively. Continuing with the example of adding a new SMTC to the MeasObjectNR IE, SMTC3, SMTC4, SMTC5, SMTC6, . . . SMTCn can be added, wherein each added SMTC comprises SSB information for a single beam cell.

It will be appreciated that the implementation of adding a new IE can also be referred to the manners of the above embodiments so as to define the SMTC information, which will not be repeated herein.

In the embodiment of the present disclosure, the UE obtains the measurement periodicity and measurement time of the SSBs through the SMTC Window. The SSBs are mainly used for downlink synchronization; and the SSBs' functions are related to many aspects for UE to access the cell, such as a cell search, a beam measurement, a beam selection, a beam recovery, and the like. When the UE is informed an SMTC window by the base station, the UE detects and measures the SSBs during the SMTC window, and then reports the measurement results to the base station. The UE would not measure beyond the SMTC duration.

Figure 6A:
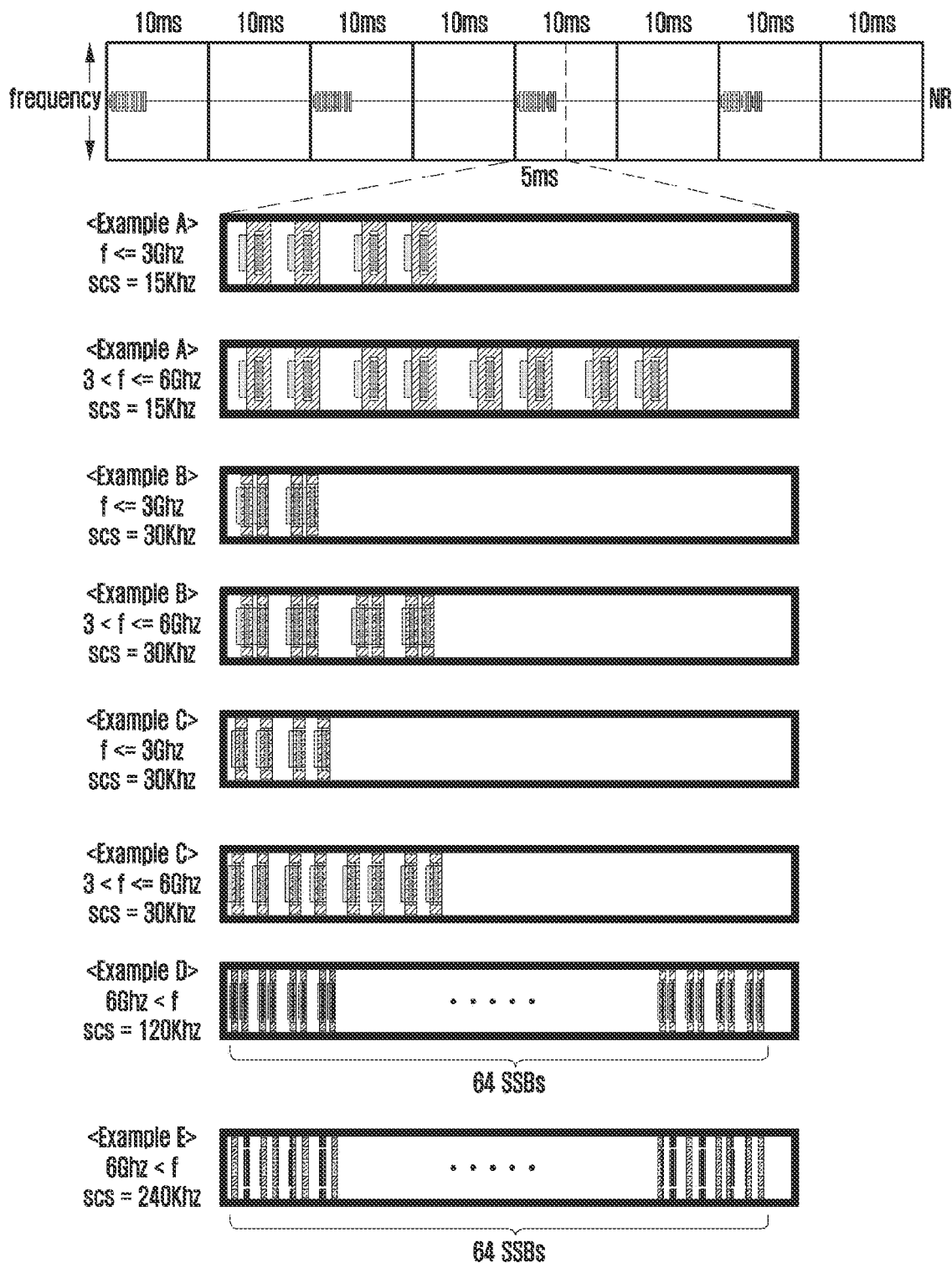
FIG. 6a illustrates a schematic diagram of a SSB burst set provided in an embodiment of the present disclosure.

The base station periodically broadcasts a group of SSB Burst Sets. The number of SSBs in a Burst depends on an operating frequency. For example, as shown in FIG. 6a, the number of SSBs is 4, when the operating frequency (fc) is <3 GHz (FR1 Frequency Range); the number of SSBs is 8, when the operating frequency (fc)>3 GHz (FR1 Frequency Range), and <=6 GHz (FR1 Frequency Range); and the number of SSBs is 64, when the operating frequency (fc)>6 GHz (FR2 Frequency Range), and the like. In FIG. 6a, SCS denotes a Subcarrier space (SCS).

In the embodiment of the present disclosure, the periodicity of the cell broadcast SSBs may be configured as 5, 10, 20, 40, 80 or 160 ms, or the like. The periodicity of the SMTC window may be configured within the same range of that of the SBBs, that is, 5, 10, 20, 40, 80 or 160 ms, or the like; the window duration may be configured as 1, 2, 3, 4 or 5 ms, or the like, depending on the number of the SSBs in the measured cell.

Based on the above embodiments, the method provided in an embodiment of the present disclosure may further comprise step S503 comprising:

determining measurement related information, the measurement related information comprising a length of a measurement window corresponding to the SMTC determined in step S501; wherein the measurement related information may further comprise, but is not limited to, at least one of the following:

(1) a Measurement Gap Length (MGL).

The measurement gap configuration as well as the measurement gap can be indicated by measGapconfig. The MGL indicates the measurement gap in ms and an MGRP indicates the measurement gap in ms.

The MGL can be configured as 6 ms, 5.5 ms, 4 ms, 3.5 ms, 3 ms, or 1.5 ms, or the like, in the 5G NR system of the related technology. As an example, in FIG. 6b, an Example 1 uses an SMTC window of 2 ms and a Gap uses an MGL of 4 ms; while an Example 2 uses an SMTC window of 4 ms and a Gap uses an MGL of a longer 6 ms.

In the embodiment of the present disclosure, in order to ensure that the SSB signals of non-terrestrial nodes accompanying the transmission delays can fall within the MG window, a new MGL can be added to the 5G NR system in the related technology by extending the original MGL to include a longer length, such as 8 ms, 10 ms, 12 ms, and the like.

Figure 7B:
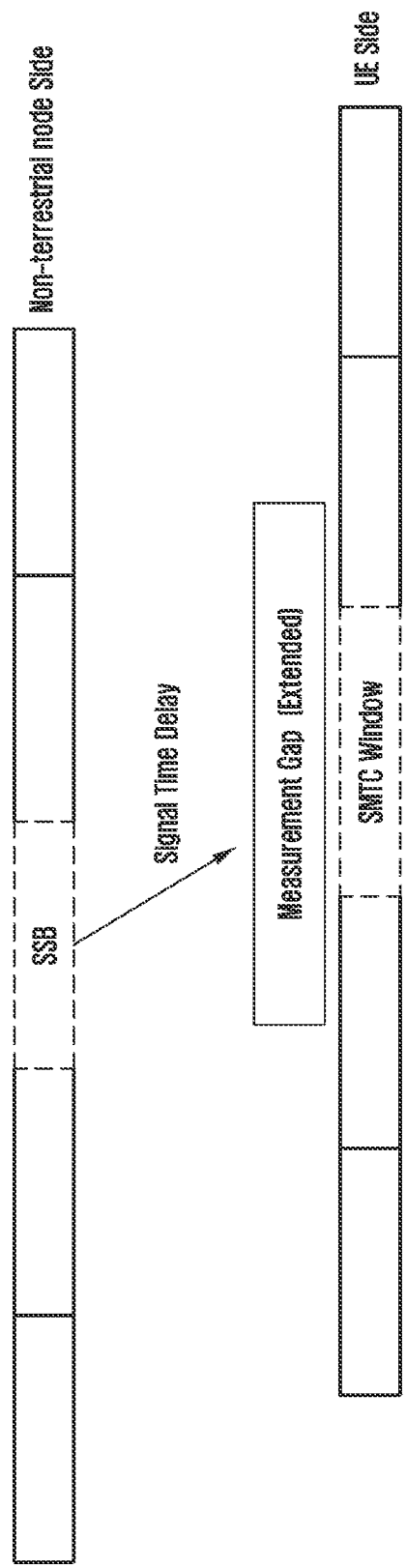
FIG. 7b illustrates a schematic diagram II of the extended MGL provided in an embodiment of the present disclosure.

In order to match the SMTC window length while avoiding unnecessary occupancy of the service throughput by a fixed Measurement Gap Length, in the embodiment of the present disclosure, the MGL is dynamically configurable, and the UE can automatically adjust the MGL to any value based on related information so as to ensure the inclusion of the measurement window length corresponding to the SMTC determined in step S501, as shown in FIG. 7a and FIG. 7b.

(2) a Periodicity length (RMTC-Periodicity) included in the Received Signal Strength Indicator (RSSI) measurement timing configuration (RSSI and channel occupancy measurement timing configuration, RMTC).

In the embodiment of the present disclosure, in order to ensure that the SSB signals of the non-terrestrial nodes accompanying the transmission delays can fall within the corresponding measurement window, a new RMTC-Periodicity length can be added to the 5G NR system in the related technology by extending the original RMTC-Periodicity length to include a longer length, such as 1280 ms, 2560 ms, and the like (including ms40, ms80, ms160, ms320, ms640, ms1280, ms2560, and the like).

Similarly, in the embodiment of the present disclosure, the RMTC-Periodicity length may be dynamically configurable, and the UE may automatically adjust the RMTC-Periodicity to any value based on related information so as to save measurement resources while ensuring the inclusion of the measurement window length corresponding to the SMTC determined in step S501.

(3) a measurement duration length (measDuration) included in the received signal strength indicator measurement timing configuration (RMTC-config).

In the embodiment of the present disclosure, to ensure that the SSB signals of the non-terrestrial nodes accompanying the transmission delays can fall within the corresponding measurement window, a new measDuration in the RMTC-config can be added to the 5G NR system in the related technology by adding more optional values to the original measDuration, such as sym98, sym140, and the like. (including sym1, sym14, sym28, sym42, sym70, sym98, sym140, and the like).

Similarly, in the embodiment of the present disclosure, the measDuration length may be dynamically configurable, and the UE may automatically adjust the measDuration length to any value based on related information so as to save measurement resources while ensuring the inclusion of the measurement window length corresponding to the SMTC determined in step S501.

(4) a T312 Timer.

In the embodiment of the present disclosure, to ensure that the measurement process can be completed for SSB signals of non-terrestrial nodes with transmission delays based on the T312, a new T312 can be added to the 5G NR system in the related technology by adding more optional values to the original T312, such as ms2000, ms4000, and the like. (including ms0, ms50, ms100, ms200, ms300, ms400, ms500, ms1000, ms2000, ms4000, and the like).

Similarly, in the embodiment of the present disclosure, the T312 value may be dynamically configurable, and the UE may automatically adjust the T312 value to any value based on related information after negotiating with the base station and building a consensus so as to ensure the inclusion of the measurement window length corresponding to the SMTC determined in step S501.

One possible implementation is provided in an embodiment of the present disclosure, wherein the step S501 may include the steps of:

Step SA: transmitting a current position of the UE to the first non-terrestrial node.

That is, the UE transmits its current position to a currently corresponding non-terrestrial node, and the non-terrestrial node can obtain its own position and the position of the neighbour non-terrestrial node based on a pre-set ephemeris, and can calculate the distance information between the non-terrestrial node itself and the UE, and the distance information between the neighbour non-terrestrial node and the UE, by combining the current position reported by the UE, and then calculate the time delays, receiving at the UE, from a neighbour beam signal of the non-terrestrial node itself and a beam signal of the neighbour non-terrestrial node. Based on the calculated time delay, the non-terrestrial node can broadcast the SSB signal and configure a corresponding SMTC window for the UE.

Step SB: receiving the SMTC configured by the first non-terrestrial node. That is, the first non-terrestrial node obtains distance information between each non-terrestrial node and the UE based on the pre-set ephemeris and the current position. And the first non-terrestrial node determines the signal time delay of the beam for each neighbour beam cell based on the distance information. The SMTC is determined based on the signal time delay of the beam for each neighbour beam cell by the first non-terrestrial node.

It is understood that the entity executing steps SA and SB is the UE, too.

Furthermore, the first non-terrestrial node may also configure corresponding measurement related information to the UE based on the calculated time delay. That is, step S503 may further comprise: receiving the measurement related information configured by the first non-terrestrial node, wherein the measurement related information is determined by the first non-terrestrial node based on the signal time delay of the beam of each neighbour beam cell.

Continuing with the example of the satellite communication system shown in FIG. 4b, the UE1 located in the beam cell A1 of the satellite A has a GNSS (Global Navigation Satellite System) capability and can obtain its own position information and report its own position information to the satellite A. Based on the pre-set ephemeris, the satellite A can calculate the signal time delay, to arriving at the UE1, of the beam for the beam cell A2 of the satellite A, as DA21, and can calculate the signal time delay, to arriving at the UE1, of the beam for the beam cell B1 of the satellite B, as DB11, respectively. The satellite A can configure SMTC (e.g., in its MeasObjectNR IE) to include information about the beam cell A2 and the beam cell B1, and configure measurement related information such as the MGL and the MGRP in the MeasGapConfig IE. The UE1 can obtain the corresponding configuration by detecting the synchronization signal of the satellite A to initiate measurements on the beam cell A2 and the beam cell B1.

Another possible implementation is provided in the embodiment of the present disclosure, wherein step S501 may include the steps of:

obtaining distance information between each non-terrestrial node and the UE based on the current position of the UE and the pre-set ephemeris;

determining a signal time delay of the beam of each neighbour beam cell base on the distance information;

determining the SMTC based on the signal time delay of the beam of each neighbour beam cell.

It is understood that the entity executing the above step is the UE, too.

Specifically, the UE has a GNSS capability, and can obtain its own position; the UE has also pre-set an ephemeris for obtaining the position of the first non-terrestrial node and the neighbour non-terrestrial node. As a result, the UE can predict and calculate the distance information between each non-terrestrial node and the UE, and thus calculate the signal time delay of the beam of each neighbour beam cell. The UE can initiate measurements on each neighbour beam cell after configuring the SMTC by itself based on the calculated signal delay.

Furthermore, the UE itself may configure measurement related information such as MGL and MGRP, based on the calculated signal delay. That is, step S503 may further comprise: determining the measurement related information based on a signal time delay of the beam of each neighbour beam cell.

Continuing with the example of a satellite communication system, and the UE1 in the beam cell A1 of the satellite A has a GNSS capability, and can obtain its own position of the UE1; the UE1 has also pre-set an ephemeris. Thus, instead of relying on the synchronization signal from the satellite A, the UE1 can predict and calculate the signal time delay, to arriving at the UE1, for the beam for neighbour beam cell A2 and the beam for the beam cell B1 of the neighbour satellite B, based on its position of the UE1, in combination with an ephemeris information. The UE1 can initiate measurements on the beam cell A2 and the beam cell B1 after the UE1 itself configures the SMTC and measurement related information based on the calculated time delay.

Figure 8:
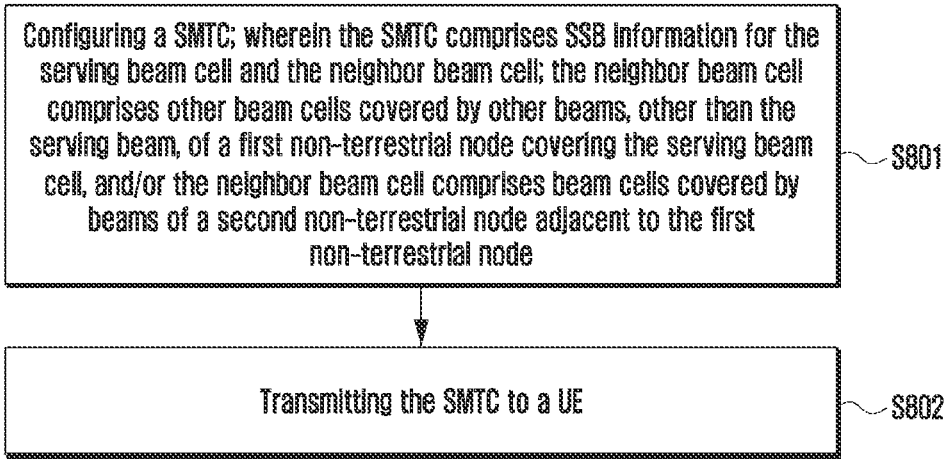
FIG. 8 illustrates a flow diagram of a method performed by a non-terrestrial node in a communication system provided in an embodiment of the present disclosure.

An embodiment of the present disclosure further provides a communication method, wherein the executing entity is a non-terrestrial node currently corresponding to the UE, (that is, the first non-terrestrial node described above). As shown in FIG. 8, the method comprises:

Step S801: configuring a Synchronization Signal Block (SSB)-based Measurement Timing Configuration (SMTC); wherein the SMTC comprises SSB information of the serving beam cell and the neighbour beam cell; the neighbour beam cell comprises other beam cell(s) covered by a beam, other than the serving beam, of a first non-terrestrial node covering the serving beam cell, and/or the neighbour beam cell comprises beam cell(s) covered by beam(s) of a second non-terrestrial node adjacent to the first non-terrestrial node.

Step S802: transmitting the SMTC to a UE.

In the embodiment of the present disclosure, the non-terrestrial node comprises, but are not limited to, satellites, High Altitude Platform Stations such as airships, drones, hot air balloons, and the like. The non-terrestrial node may perform signal processing.

In the embodiment of the present disclosure, the non-terrestrial node may notify the relevant measurement configuration to the UE according to an RRC message. In a feasible implementation, this SMTC may be indicated by a measObjectNR IE in the RRC message. That is, a new SMTC message is added to the measObjectNR IE in the 5G NR system of the related technology, for defining the SSB information of the serving beam cell and the neighbour beam cell; wherein, the neighbour beam cell comprises other beam cell(s) covered by other beam(s), other than the serving beam, of a first non-terrestrial node covering the serving beam cell, and/or the neighbour beam cell comprises beam cell(s) covered by beam(s) of a second non-terrestrial node adjacent to the first non-terrestrial node.

In another possible implementation, the SMTC is indicated by a predefined IE in the RRC message. That is, a new IE (such as MeasObjectNR-NTN (Non-terrestrial Network) IE) is added, and new SMTC information is added in this new IE, in comparison with the MeasObjectNR IE in the 5G NR system of the related technology, for defining the SSB information of the serving beam cell and the neighbour beam cell; wherein, the neighbour beam cell comprises other beam cell(s) covered by other beam(s), other than the serving beam, of a first non-terrestrial node covering the serving beam cell, and/or the neighbour beam cell comprises beam cell(s) covered by beam(s) of a second non-terrestrial node adjacent to the first non-terrestrial node The SMTC in the embodiment of the present disclosure may include at least one of the following scenarios.

(1) At least one SMTC comprising SSB information of each beam cell.

Optionally, one SMTC may comprise SSB information of each beam cell. As an example of adding a new SMTC to the MeasObjectNR IE, a new SMTC3 may be added so as to comprise SSB information for each beam cell, and the corresponding MeasObjectNR field description may be the following:

smtc3
information for a beam cell 1.
information for a beam cell 2.
information for a beam cell 3.

Optionally, a plurality of SMTCs may comprise SSB information of each beam cell. Continuing with the example of adding a new SMTC to the MeasObjectNR IE, SMTC3 and SMTC4 may be added so as to comprise SSB information of a plurality of beam cells. SMTC3 and SMTC4 may correspond to SSB information of different numbers of beam cells. For example, SMTC3 comprises SSB information of one beam cell, while SMTC4 comprises SSB information of multiple beam cells, and the like.

(2) At least two SMTCs respectively corresponding to the SSB information for each beam cell.

That is, the new SMTC information can be added on a piece-by-piece basis corresponding to each beam cell respectively. Continuing with the example of adding a new SMTC to the MeasObjectNR IE, SMTC3, SMTC4, SMTC5, SMTC6, . . . SMTCn can be added, wherein each added SMTC comprises SSB information of a single beam cell.

It will be appreciated that the implementation of adding a new IE can also be referred to the manners of the above embodiments so as to define the SMTC information, which will not be repeated herein.

Based on the above embodiments, the method provided in an embodiment of the present disclosure may further comprise step S803.

determining measurement related information, the measurement related information comprising a length of a measurement window corresponding to the SMTC configured in step S801; wherein the measurement related information may further comprise, but is not limited to, at least one of the following:

(1) an MGL.

The measurement gap configuration as well as the measurement gap can be indicated by measGapconfig. The MGL indicates the measurement gap in ms and an MGRP indicates the measurement gap in ms.

In the embodiment of the present disclosure, in order to ensure that the SSB signals of non-terrestrial nodes accompanying the transmission delays can fall within the MG window, a new MGL can be added to the 5G NR system in the related technology by extending the original MGL to include a longer length, such as 8 ms, 10 ms, 12 ms, and the like.

In order to match the SMTC window length while avoiding unnecessary occupancy of the service throughput by a fixed Measurement Gap Length, in the embodiment of the present disclosure, the MGL is dynamically configurable, and the non-terrestrial nodes can configure the MGL according to actual requirements, so as to ensure the inclusion of the measurement window length corresponding to the SMTC configured in step S801.

(2) An RMTC-Periodicity.

In the embodiment of the present disclosure, in order to ensure that the SSB signals of the non-terrestrial nodes accompanying the transmission delays can fall within the corresponding measurement window, a new RMTC-Periodicity length can be added to the 5G NR system in the related technology by extending the original RMTC-Periodicity length to include a longer length, such as 1280 ms, 2560 ms, and the like (including ms40, ms80, ms160, ms320, ms640, ms1280, ms2560, and the like).

Similarly, in the embodiment of the present disclosure, the RMTC-Periodicity length may be dynamically configurable, and the non-terrestrial node may configure the RMTC-Periodicity according to actual requirements, so as to save measurement resources while ensuring the inclusion of the measurement window length corresponding to the SMTC configured in step S801.

(3) A measDuration in the RMTC-configure

In the embodiment of the present disclosure, to ensure that the SSB signals of the non-terrestrial nodes accompanying the transmission delays can fall within the corresponding measurement window, a new measDuration in the RMTC-config can be added to the 5G NR system in the related technology by adding more optional values to the original measDuration, such as sym98, sym140, and the like (including sym1, sym14, sym28, sym42, sym70, sym98, sym140, and the like).

Similarly, in the embodiment of the present disclosure, the measDuration length may be dynamically configurable, and the non-terrestrial node may configure the measDuration length according to actual requirements so as to save measurement resources while ensuring the inclusion of the measurement window length corresponding to the SMTC configured in step S801.

(4) A T312 Timer.

In the embodiment of the present disclosure, to ensure that the measurement process can be completed for SSB signals of non-terrestrial nodes with transmission delays based on the T312, a new T312 can be added to the 5G NR system in the related technology by adding more optional values to the original T312, such as ms2000, ms4000, and the like (including ms0, ms50, ms100, ms200, ms300, ms400, ms500, ms1000, ms2000, ms4000, and the like).

Similarly, in the embodiment of the present disclosure, the T312 value may be dynamically configurable, and the non-terrestrial node may configure the T312 value as appropriate to ensure the inclusion of a length of the measurement window corresponding to the SMTC configured in step S801.

One possible implementation is provided in an embodiment of the present disclosure, wherein the step S801 may include the steps of:

receiving the current position transmitted by the UE;
obtaining distance information between each non-terrestrial node and the UE based on the current position and the pre-set ephemeris;
determining the signal time delay of the beam of each neighbour beam cell based on the distance information;
configuring the SMTC based on the signal time delay of the beam of each neighbour beam cell.

That is, the UE transmits its current position to the current corresponding non-terrestrial node, and the non-terrestrial node can obtain its own position and the position of the neighbour non-terrestrial node based on a pre-set ephemeris, and can calculate the distance information between the non-terrestrial node itself and the UE, and the distance information between the neighbour non-terrestrial node and the UE by combining the current position reported by the UE, and then calculate the time delays, receiving at the UE, from a neighbour beam signal of the non-terrestrial node itself and a beam signal of the neighbour non-terrestrial node. Based on the calculated time delays, the non-terrestrial node can broadcast the SSB signal and configure a corresponding SMTC window to the UE.

Furthermore, the first non-terrestrial node may further configure corresponding measurement related information to the UE based on the calculated delay. That is, step S803 may further comprise a step of: configuring the measurement related information based on a signal time delay of the beam of each neighbour beam cell.

Taking the satellite (corresponding to a non-terrestrial node) communication system shown in FIG. 4b as an example, the UE1 located in the beam cell A1 of the satellite A has a GNSS capability and can obtain its own position information and report its own position information to the satellite A. Based on the pre-set ephemeris, the satellite A can calculate the signal time delay, for arriving at the UE1, of the beam for the beam cell A2 of the satellite A, as DA21, and calculate the signal time delay, for arriving at the UE1, of the beam for the beam cell B1 of the satellite B, as DB11, respectively. The satellite A can configure the SMTC to include the information about the beam cell A2 and the beam cell B1 and configure the measurement related information such as MGL and MGRP. The UE1 can obtain the corresponding configuration by detecting the synchronization signal from the satellite A, so as to initiate measurements on the beam cell A2 and the beam cell B1.

In the embodiment of the present disclosure, the "first" and "second" in the first non-terrestrial node and the second non-terrestrial node are only used to distinguish the non-terrestrial nodes, and are not to be understood as limiting the number or the order of the non-terrestrial nodes. For example, the number of the second non-terrestrial node adjacent to the first non-terrestrial node may be one or more.

The communication method provided in an embodiment of the present disclosure improves the Measurement Timing Configuration SMTC of the cell synchronization signal. The improved SMTC comprises SSB information of the serving beam cell and the neighbour beam cell; wherein the neighbour beam cell comprises other beam cell(s) covered by other beam(s), other than the serving beam, of the first non-terrestrial node covering the serving beam cell, and/or the neighbour beam cell comprises beam cell(s) covered by beam(s) of a second non-terrestrial node adjacent to the first non-terrestrial node beam cell, so that the UE could timely and reliably obtain SSB signals of the beam cell covered by the beam, other than the serving beam, of the first non-terrestrial node and/or SSB signals of the beam cell covered by the beam of the second non-terrestrial node so as to implement a cell measurement in a non-terrestrial communication network.

Figure 9:
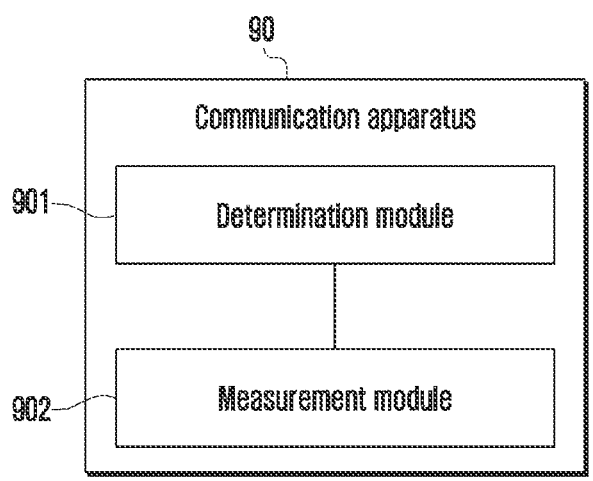
FIG. 9 illustrates a structural schematic diagram of a communication apparatus provided in an embodiment of the present disclosure.

Embodiments of the present disclosure also provide a communication apparatus. As shown in FIG. 9, a communication apparatus 90 may include: a determination module 901, and a measurement module 902, wherein The determination module 901 for determining a Synchronization Signal Block (SSB)-based Measurement Timing Configuration (SMTC); wherein the SMTC comprises SSB information of a serving beam cell and a neighbour beam cell; the neighbour beam cell comprises other beam cell(s) covered by other beam(s), other than the serving beam, of a first non-terrestrial node covering the serving beam cell, and/or the neighbour beam cell comprises beam cell(s) covered by beam(s) of a second non-terrestrial node adjacent to the first non-terrestrial node;

The measurement module 902 is configured for performing a cell measurement based on the SMTC.

In an optional implementation, the SMTC comprises at least one of the following:

at least one SMTC comprising SSB information of each beam cell;
at least two SMTCs respectively corresponding to the SSB information of each beam cell.

In an optional implementation, the SMTC is indicated by a measObjectNR Information Element in a Radio Resource Control RRC message; or, the SMTC is indicated by a predefined Information Element in the RRC message.

In an optional implementation, the determination module 901 is further configured for:

determining measurement related information, the measurement related information comprising a length of a measurement window corresponding to the SMTC.

The measurement related information may further comprise at least one of the following:

a Measurement Gap Length;
a Periodicity length included in a received signal strength indicator measurement timing configuration;
a measurement duration length included in the received signal strength indicator measurement timing configuration;
a T312 Timer.

In an optional implementation, the determination module 901, when configured for determining the SMTC, is specifically configured for:

transmitting a current position of the UE to the first non-terrestrial node;
receiving the SMTC configured by the first non-terrestrial node, wherein the first non-terrestrial node determines the SMTC based on a signal time delay of the beam of each neighbour beam cell, after the first non-terrestrial node obtains distance information between each non-terrestrial node and the UE based on a pre-set ephemeris and the current position, and determines the signal time delay of the beam of each neighbour beam cell based on the distance information.

Furthermore, the determination module 901, when configured for determining the measurement related information, is specifically configured for:

receiving the measurement related information configured by the first non-terrestrial node, wherein the first non-terrestrial node determines the measurement related information based on the signal time delay of the beam of each neighbour beam cell.

In an optional implementation, the determination module 901, when configured for determining the SMTC, is specifically configured for:

obtaining distance information between each non-terrestrial node and the UE based on the current position of the UE and the pre-set ephemeris;

determining a signal time delay of the beam of each neighbour beam cell base on the distance information;

determining the SMTC based on the signal time delay of the beam of each neighbour beam cell.

Furthermore, the determination module 901, when configured for determining measurement related information, is specifically configured for:

determining the measurement related information based on a signal time delay of each neighbour beam cell beam.

It will be clearly appreciated to those skilled in the art that the communication apparatus provided by the embodiments of the present disclosure, the principle of its implementation and the technical effect thereof are the same as those of the preceding method embodiments. And for conveniently and concisely describing, regarding to embodiments not mentioned in this part, a reference may be made to the corresponding contents of the preceding method embodiments, which will not be repeated herein.

Figure 10:
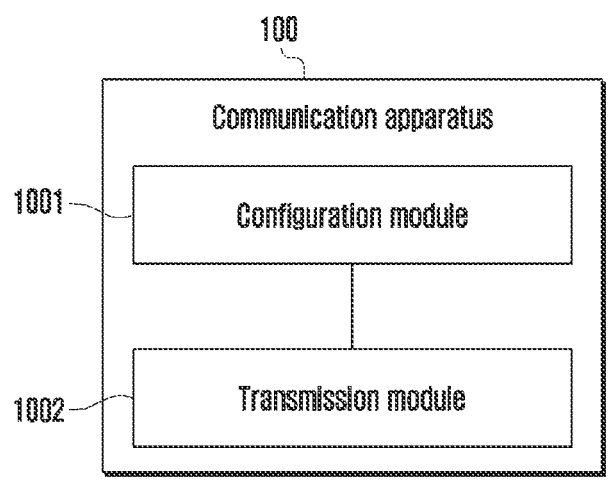
FIG. 10 illustrates a structural schematic diagram of another communication apparatus provided in an embodiment of the present disclosure.

Embodiments of the present disclosure also provide a communication apparatus, as shown in FIG. 10, wherein the communication apparatus 100 may include: a configuration module 1001 and a detection and transmission module 1002, wherein:

The configuration module 1001 is configured for configuring a Synchronization Signal Block (SSB) Measurement Timing Configuration (SMTC); wherein the SMTC comprises SSB information for the serving beam cell and a neighbour beam cell; the neighbour beam cell comprises other beam cell(s) covered by other beam(s), other than the serving beam, of a first non-terrestrial node covering the serving beam cell, and/or the neighbour beam cell comprises beam cell(s) covered by beam(s) of a second non-terrestrial node adjacent to the first non-terrestrial node.

The transmitter module 1002 is configured for transmitting the SMTC to the UE.

In an optional implementation, the SMTC comprises at least one of the following:

at least one SMTC comprising SSB information for each beam cell.

at least two SMTCs respectively corresponding to the SSB information for each beam cell.

In an optional implementation, the SMTC is indicated by a measObjectNR Information Element in a Radio Resource Control RRC message; or The SMTC is indicated by a predefined Information Element in the RRC message.

In an optional implementation, the configuration module 1001 is further configured for:

configuring measurement related information, which includes a length of the measurement window corresponding to the SMTC.

Transmitting the measurement related information to the UE.

wherein the measurement related information may further comprise at least one of the following:

a Measurement Gap Length;

a Periodicity length included in a received signal strength indicator measurement timing configuration;

a measurement duration length included in the received signal strength indicator measurement timing configuration;

a T312 Timer.

In an optional implementation, the configuration module 1001, when used to configure the SMTC, is specifically configured for:

receiving a current position transmitted by the UE;

obtaining distance information between each non-terrestrial node and the UE based on the current position and the pre-set ephemeris;

determining a signal time delay of the beam of each neighbour beam cell based on the distance information;

configuring the SMTC based on the signal time delay of the beam of each neighbour beam cell;

Furthermore, the configuration module 1001, when used to configure measurement related information, is specifically configured for:

configuring the measurement related information based on the signal time delay of each neighbour beam cell beam.

It will be clearly appreciated to those skilled in the art that the communication apparatus provided by the embodiments of the present disclosure, the principle of its implementation and the technical effect thereof are the same as those of the preceding method embodiments. And for conveniently and concisely describing, regarding to embodiments not mentioned in this part, a reference may be made to the corresponding contents of the preceding method embodiments, which will not be repeated herein.

An electronic device is provided in an embodiment of the present disclosure, the electronic device comprising: a memory and a processor. At least one instruction, at least one program segment, a set of codes or a set of instructions, are stored in the memory for being used by the processor to execute the corresponding contents of any of the preceding method embodiments.

It will be appreciated that, for different embodiments, the electronic device may be a UE or a non-terrestrial node.

In an optional embodiment the present disclosure provides an electronic device, the electronic device comprising: a processor and a memory. The processor and the memory are connected, such as via a bus. Optionally, the electronic device may further comprise a transceiver. The transceiver may be configured for data interaction between the electronic device and other electronic devices, such as a transmitting of data and/or a receiving of data. It is to be noted that the transceiver is not limited to one in practical applications, and the structure of the electronic device would not be interpreted as a limitation to an embodiment of the present disclosure.

The processor may be a CPU (Central Processing Unit), a general purpose processor, a DSP (Digital Signal Processor), an ASIC (Application Specific Integrated Circuit), an FPGA (Field Programmable Gate Array) or other programmable logic device, transistor logic device, hardware component, or any combination thereof. The processor may implement or execute various illustrative logical blocks, modules and circuits described with reference to the disclosure of the present disclosure. The processor can also be a combination for implementing computing functions, such as a combination comprising one or more microprocessors, a combination of a DSP and a microprocessor, and the like.

The bus may include a path for communicating information between the components described above. The bus may be a PCI (Peripheral Component Interconnect) bus or an EISA (Extended Industry Standard Architecture) bus or the like. The bus may be divided into an address bus, a data bus, a control bus, and the like.

The memory may be an ROM (Read Only Memory) or other types of static storage devices that may store static information and instructions, an RAM (Random Access Memory) or other types of dynamic storage devices that may store information and instructions, or may be an EEPROM (Electrically Erasable Programmable Read Only Memory), a CD-ROM (Compact Disc Read Only Memory) or other optical disk storages, optical disc storages (including compact disc, laser disc, optical disc, digital versatile disc, Blu-ray disc, etc.), magnetic disk storage media or other magnetic storage devices, or any other media that may be used to carry or store desired program codes in the form of instructions or a data structure and can be accessed by the computer, but not limited to this.

The memory is configured for storing application codes (computer program) for executing the solution of the present disclosure, and is controlled by the processor for execution. The processor is configured to execute application codes stored in the memory to implement the content shown in any of the preceding method embodiments.

Embodiments of the present disclosure provide a computer readable storage medium including computer instructions, a program, a set of codes, or a set of instructions stored in the computer readable storage medium. When the computer instructions, the program, the set of codes, or the set of instructions are run in the computer, the computer executes a corresponding content of any of the preceding method embodiments.

It should be understood that although the various steps in the flowchart of the drawings are displayed in a sequence as indicated by the arrows, these steps are not necessarily performed in the sequence indicated by the arrows. Unless otherwise explicitly stated herein, these steps are not strictly limited to be executed in the sequence, and may be performed in any other sequence. Moreover, at least some of the steps in the flowchart of the drawings may include a plurality of sub-steps or a plurality of stages. The sub-steps or the stages are not necessarily performed at the same moment, but may be executed at different moments. And it is not necessary to execute the sub-steps or the stages in a sequence. However, the sub-steps or the stages may be executed intermittently or alternately with at least a portion of other steps or sub-steps or stages of other steps.

The above is only a part of implementation of the present disclosure. It should be noted that those skilled in the art can also make several improvements and modifications without departing from the principles of the present disclosure. The improvements and modifications should be considered as within the scope of protection of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:
   receiving information associated with a synchronization signal block (SSB) measurement timing configuration (SMTC), wherein the information associated with the SMTC is included in a measurement object information element (IE) in a radio resource control (RRC) message;
   determining the SMTC based on the information, wherein the SMTC is for a serving cell and a neighbour cell associated with a non-terrestrial network (NTN); and
   performing a cell measurement based on the SMTC.

2. The method of claim 1, wherein the information associated with the SMTC includes information associated with a plurality of cells in the NTN.

3. The method of claim 1, further comprising:
   determining measurement related information,
   wherein the measurement related information includes at least one of:
      a length of a measurement window corresponding to the SMTC,
      a measurement gap length,
      a periodicity length included in a received signal strength indicator measurement timing configuration,
      a measurement duration length included in the received signal strength indicator measurement timing configuration, or
      a T312 timer.

4. The method of claim 1, wherein the neighbour cell comprises a cell among cells covered by a first non-terrestrial node or a cell covered by a second non-terrestrial node adjacent to the first non-terrestrial node.

5. The method of claim 1, wherein determining the SMTC comprises:
   obtaining distance information between each non-terrestrial node and the UE based on a current position of the UE and an ephemeris;
   determining a signal time delay of a beam of each neighbour cell based on the distance information; and
   determining the SMTC based on the signal time delay of the beam of each neighbour cell.

6. The method of claim 3, wherein determining the measurement related information comprises:
   receiving the measurement related information configured by a first non-terrestrial node, the measurement related information being determined, by the first non-terrestrial node, based on a signal time delay of a beam of each neighbour cell.

7. The method of claim 3, wherein the measurement related information is determined based on a signal time delay of a beam of each neighbour cell.

8. A method performed by a non-terrestrial node in a communication system, the method comprising:
   identifying a synchronization signal block (SSB) measurement timing configuration (SMTC), wherein the SMTC is for a serving cell and a neighbour cell associated with a non-terrestrial network (NTN); and
   transmitting, to a user equipment (UE), information associated with the SMTC,
   wherein the SMTC is associated with a cell measurement, and
   wherein the information associated with the SMTC is included in a measurement object information element (IE) in a radio resource control (RRC) message.

9. The method of claim 8, wherein the information associated with the SMTC includes information associated with a plurality of cells in the NTN.

10. The method of claim 8, further comprising:
configuring measurement related information; and
transmitting, to the UE, the measurement related information,
wherein the measurement related information includes at least one of:
- a length of a measurement window corresponding to the SMTC,
- a measurement gap length,
- a periodicity length included in a received signal strength indicator measurement timing configuration,
- a measurement duration length included in the received signal strength indicator measurement timing configuration, or
- a T312 timer.

11. The method of claim 8, wherein identifying the SMTC comprises:
receiving, from the UE, a current position of the UE;
obtaining distance information between each non-terrestrial node and the UE based on the current position and a pre-set ephemeris;
determining a signal time delay of a beam of each neighbour cell based on the distance information; and
configuring the SMTC based on the signal time delay of the beam of each neighbour cell.

12. The method of claim 10, wherein, the measurement related information is configured based on a signal time delay of a beam of each neighbour cell.

13. A user equipment (UE) in a communication system, the UE comprising:
a transceiver; and
a controller operably coupled to the transceiver, the controller configured to:
receive information associated with a synchronization signal block (SSB) measurement timing configuration (SMTC), wherein the information associated with the SMTC is included in a measurement object information element (IE) in a radio resource control (RRC) message,
determine the SMTC based on the information, wherein the SMTC is for a serving cell and a neighbour cell associated with a non-terrestrial network (NTN), and
perform a cell measurement based on the SMTC.

14. A non-terrestrial node in a communication system, the non-terrestrial node comprising:
a transceiver; and
a controller operably coupled to the transceiver, the controller configured to:
identify a synchronization signal block (SSB) measurement timing configuration (SMTC), wherein the SMTC is for a serving cell and a neighbour cell associated with a non-terrestrial network (NTN), and
transmit, to a user equipment (UE), information associated with the SMTC,
wherein the SMTC is associated with a cell measurement, and
wherein the information associated with the SMTC is included in a measurement object information element (IE) in a radio resource control (RRC) message.

* * * * *